(12) United States Patent
Hashemi et al.

(10) Patent No.: US 10,656,496 B2
(45) Date of Patent: May 19, 2020

(54) MONOLITHICALLY INTEGRATED LARGE-SCALE OPTICAL PHASED ARRAY

(71) Applicant: University of Southern California, Los Angeles, CA (US)

(72) Inventors: Hossein Hashemi, Pacific Palisades, CA (US); SungWon Chung, Los Angeles, CA (US); Hooman Abediasl, Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 139 days.

(21) Appl. No.: 15/667,536

(22) Filed: Aug. 2, 2017

(65) Prior Publication Data

US 2018/0039154 A1 Feb. 8, 2018

Related U.S. Application Data

(60) Provisional application No. 62/370,131, filed on Aug. 2, 2016.

(51) Int. Cl.
*G02F 1/29* (2006.01)
*G02F 1/295* (2006.01)
*H01Q 21/06* (2006.01)

(52) U.S. Cl.
CPC ............ *G02F 1/292* (2013.01); *G02F 1/2955* (2013.01); *H01Q 21/06* (2013.01)

(58) Field of Classification Search
CPC ........ G02F 1/292; G02F 1/295; G02F 1/2955; G02F 2001/291; H01Q 3/26; H01Q 21/06; H01Q 21/061; G02B 27/0087

USPC ............................. 385/4, 8, 14; 398/115, 188
See application file for complete search history.

(56) References Cited

U.S. PATENT DOCUMENTS

| 8,467,641 | B2 * | 6/2013 | Krill | G02B 6/12004 |
| | | | | 385/17 |
| 8,988,754 | B2 * | 3/2015 | Sun | G02B 6/26 |
| | | | | 359/238 |
| 2013/0322892 | A1 * | 12/2013 | Aflatouni | H04B 10/2504 |
| | | | | 398/188 |
| 2015/0346340 | A1 * | 12/2015 | Yaacobi | G01S 17/36 |
| | | | | 356/5.11 |
| 2016/0218429 | A1 * | 7/2016 | Klemes | H01Q 3/34 |
| 2017/0131615 | A1 * | 5/2017 | Park | G02F 1/025 |

(Continued)

OTHER PUBLICATIONS

Abediasl et al., Monolithic Optical Phased-Array Transceiver in a Standard SO CMOS Process, Optics Express, 2015, vol. 23(5), pp. 6509-6519.

(Continued)

*Primary Examiner* — Robert Tavlykaev
(74) *Attorney, Agent, or Firm* — Nixon Peabody LLP

(57) ABSTRACT

An optical device includes a row of optical units, each of the optical units comprising an antenna element and an associated phase shifting element, a first optical power splitter optically coupled to a first optical input/output element, and a first plurality of boundary adjustment elements. In the optical phased array, each of the first plurality of boundary adjustment units optically couples the first optical power splitter to different sub-rows of the row of optical units, and each of the plurality of boundary adjustment elements include a sub-row amplitude adjustment element and a sub-row phase adjustment element.

20 Claims, 29 Drawing Sheets

(56) References Cited

U.S. PATENT DOCUMENTS

2017/0207545 A1* 7/2017 Miraftab ............... H01Q 5/307
2018/0039153 A1 2/2018 Hashemi et al.

OTHER PUBLICATIONS

Adar et al., Phase Coherence of Optical Waveguides, Journal of lightwave technology, 1994, vol. 12(4), pp. 603-606.
Aflatouni et al., Nanophotonic Projection System, Optics Express, 2015, vol. 23(16). pp. 21012-21022.
Apostolidou et al., A 65nm CMOS 30 dBm class-E RF Power Amplifier with 60% PAE and 40% PAE at 16 dB back-Off, IEEE Journal of Solid-State Circuits, 2009, vol. 44(5), pp. 1372-1379.
Chan et al., Optical Beamsteering Using an 8 x 8 MEMS Phased Array with Closed-Loop Interferometric Phase Control, Optics Express, 2013, vol. 21(3), p. 2807.
Cherchi et al., Dramatic Size Reduction of Waveguide Bends on a Micron-Scale Silicon Photonic Platform, Optics Express, 2013, vol. 21(15), p. 17814.
Chorostowski et al., Impact of Fabrication Non-Uniformity on Chip-Scale Silicon Photonic Integrated Circuits, Proc. Optical Fiber Communication Conference, 2014, pp. 1-3.
Chrostowski et al., Silicon Photonics Design, Cambridge University Press, 2015.
Doylend et al., Two-Dimensional Free-Space Beam Steering with an Optical Phased Array on Silicon-on-Insulator, Optics Express, 2011, vol. 19(22).
Feced et al., Effects of Random Phase and Amplitude Errors in Optical Fiber Bragg Gratings, Journal of Lightwave Technology, 2000, vol. 18(1), pp. 90-101.
Godoy et al., A 2.4-GHz, 27-dBm Asymmetric Multilevel Outphasing Power Amplifier in 65-nm CMOS, IEEE Journal of Solid-State Circuits, 2012, vol. 47(10), pp. 2372-2384.
Guan et al., A Fully Integrated 24 GHz 8-Path Phased-Array Receiver in Silicon, IEEE International Solid-State Circuits Conf. Tech. Dig. Papers, 2004, vol. 39(12), pp. 390-391.
Guo et al., Two-Dimensional Optical Beam Steering with InP-Based Photonic Integrated Circuits, IEEE Journal of Selected Topics in Quantum Electronics, 2013, vol. 19(4).
Harris et al., Efficient, Compact and Low Loss Thermo-Optic Phase Shifter in Silicon, Optics Express, 2014, vol. 22 (9), p. 10487.
Henry, C., Theory of the Linewidth of Semiconductor Lasers, IEEE Journal of Quantum Electronics, 1982. vol. 18(2), pp. 259-264.
Hulme et al., Fully Integrated Hybrid Silicon Two Dimensional Beam Scanner, Optics Express, 2015, vol. 23(5), p. 5861.
Hutchison et al., High-Resolution Aliasing-Free Optical Beam Steering, Optica, 2016, vol. 3(8), p. 887.
Kinget et al., A Programmable Analog Cellular Neural Network CMOS Chip for High Speed Image Processing, IEEE Journal of Solid-State Circuits, 1995, vol. 30(3), pp. 235-243.
Krasavin et al., Silicon-Based Plasmonic Waveguides, Opt. Express 18, 2010, pp. 11791-11799.
Krisfinamoorthy et al., Exploiting CMOS Manufacturing to Reduce Tuning Requirements for Resonant Optical Devices, IEEE Photonics Journal, 2011, vol. 3(3), pp. 567-579.
Kwong et al., 1 x 12 Unequally Spaced Waveguide Array for Actively Tuned Optical Phased Array on a Silicon Nanomembrane, Applied Physics Letters, 2011, vol. 99.
Kwong et al., On-chip Silicon Optical Phased Array for Two-Dimensional Beam Steering, Optics Letters, 2014, vol. 39(4), pp. 941-944.
Liu et al., Ultra-Low-Loss CMOS-Compatible Waveguide Crossing Arrays Based on Multimode Bloch Waves and Imaginary Coupling, Optics Letters, 2014, vol. 39(2).
McManamon et al., Optical Phased Array Technology, Proceedings of the IEEE, 1996, vol. 84, No. 2, pp. 268-298.
Michael et al., Statistical Modeling of Device Mismatch for Analog MOS Integrated Circuits, IEEE Journal of Solid-State Circuits, 1992, vol. 27(2), pp. 154-166.
Poulton et al., Frequency-Modulated Continuous-Wave LIDAR Module in Silicon Photonics, Proc. Optical Fiber Communication Conference, 2016, pp. 1-3.
Poulton et al., Optical Phased Array with Small Spot Aize, High Steering Range and Grouped Cascaded Phase Shifters, Proc. Advanced Photonics Congress, 2016, pp. 1-3.
Poulton et al., Large-Scale Silicon Nitride Nanophotonic Phased Arrays at Infrared and Visible Wavelengths, Optics Letters, 2017, vol. 42(1), p. 21.
Schwarz, B., LIDAR: Mapping the World in 3-D, Nature Photonics, 2010, vol. 4(7), pp. 429-430.
Simard et al., Characterization and Reduction of Spectral Distortions in Silicon-on-Insulator Integrated Bragg Gratings, Optics Express, 2013, vol. 21(20), p. 23145.
Smalley et al., Anisotropic Leaky-Mode Modulator for Holographic Video Displays, Nature, 2013, vol. 498(7454), pp. 313-317.
Sun et al., Large-Scale Nanophotonic Phased Array, Nature, 2013, vol. 493, pp. 195-199.
Sun et al., Single-Chip Microprocessor that Communicates Directly using Light, Nature, 2015, vol. 528, pp. 534-538.
Sun et al., A 45nm CMOS-SOI Monolithic Photonics Platform with Bit-Statistics-Based Resonant Microring Thermal Tuning, IEEE Journal of Solid-State Circuits, 2016, vol. 51(4), pp. 893-907.
Van Acoleyen et al., Off-Chip Beam Steering with a One-Dimensional Optical Phased Array on Silicon-on-Insulator, Optics Letters, 2009, vol. 34(9), p. 1477.
Van Acoleyen et al., Two-Dimensional Optical Phased Array Antenna on Silicon-on-Insulator, Optics Express, 2010, vol. 18(13).
Vasey et al., Spatial Optical Beam Steering with an AlGaAs Integrated Phased Array, Applied Optics, 1993, vol. 32 (18), pp. 3220-3232.
Wang et al., Modeling and design of an optimized liquid-crystal optical phased array, Journal of Applied Physics, 2005, vol. 98(7), p. 073101.
Wang et al., Micromirror Based Optical Phased Array for Wide-Angle Beamsteering, IEEE International Conference on Micro Electro Mechanical Systems, 2017, pp. 897-900.
Xiong et al., Integrated GaN Photonic Circuits on Silicon (100) for Second Harmonic Generation, Optics Express, 2011, vol. 19(11), pp. 10 462-10 470.
Yaacobi et al., Integrated Phased Array for Wide-Angle Beam Steering, Optics Letters, 2014, vol. 39(15), pp. 4575.
Yang et al., Phase Coherence Length in Silicon Photonic Platform, Optics Express, 2015, vol. 23(13), p. 16890.
Yaras et al., State of the Art in Holographic Displays: A Survey, Journal of Display Technology, 2010, vol. 6(10), pp. 443-454.
Yariv, A., Coupled-Mode Theory for Guided-Wave Optics, IEEE Journal of Quantum Electronics, 1973, vol. 9(9), pp. 919-933.
Yariv et al., Photonics: Optical Electronics in Modem Communications, Oxford University Press, 2007.
Ye et al., A 2-D resonant MEMS Scanner with an Ultra-Compact Wedge-like Multiplied Angle Amplification for Miniature LIDAR Application, IEEE Sensors, 2016, pp. 1-3.
Zortman et al., Silicon Photonics Manufacturing, Optics express, 2010, vol. 18(23), pp. 23 598-23 607.
360-Degree 3-D LIDAR M8-1 Sensor, Sunnyvale, CA, USA:, 2015.
Velodyne's HDL-64e: A High-Definition LIDAR Sensor for 3-D Applications, Morgan Hill, CA, USA:, 2007.

* cited by examiner

MONOLITHICALLY INTEGRATED LARGE-SCALE OPTICAL PHASED ARRAY

CROSS-REFERENCE TO RELATED APPLICATIONS

This application claims priority to and the benefit of U.S. Provisional Patent Application No. 62/370,131, filed Aug. 2, 2016 and entitled "LARGE-SCALE OPTICAL PHASED ARRAY", of which paragraphs [0001]-[0042], paragraphs [0055]-[0083], and FIGS. 1-25 are herein incorporated by reference in their entirety.

FIELD OF THE INVENTION

The present invention relates generally to optical beamforming, specifically to large-scale silicon nanophotonic phased array on a chip for creating, dynamically steering, and detecting a high-resolution optical beam in free space.

BACKGROUND

Shaping and steering optical beams in a compact device with ultra-high resolution and fast speed enables applications in sensing, imaging, ranging, communication, and display. Conventional optical beam steering solutions have been largely based on mechanical mechanisms. For instance, a mechanically rotating mirror is often used in 3D ranging sensors such as commercial lidars [1], and an array of integrated micro-electromechanical system (MEMS) mirrors is used for some projection displays [2]-[4]. Mechanical optical steering solutions are generally slow and susceptible to physical wear and tear as well as vibration. Depending on the realization, these mechanical beam-steering systems may be bulky, consume significant energy, and have a limited steering capability. Furthermore, these mechanical approaches are only capable of steering a light beam, and are incapable of forming arbitrarily shaped light beams as needed for advanced communication, imaging, and sensing applications. Non-mechanical optical beam steering is possible by modifying the effective refractive index of a transmissive (e.g., prism) or reflective (e.g., grating) structure. Liquid crystal spatial light modulators [5]-[7] and acousto-optic spatial light modulators [8] are examples of such commercial systems (e.g., holographic displays).

Monolithic integration of nanophotonic devices and advanced electronic devices on a single chip is bringing up a new opportunity to realize an innovative electro-optic solution towards optical beam forming. Electromagnetic wavefront can be arbitrarily formed by a phased array which consists of spatially separated antennas each with an independent control of phase and amplitude of the signal. The phased array concept has been known for over a century, and was matured primarily during the World War II in the context of electrically-scanned radars. For several decades, radio frequency phased arrays had been used in military applications. Over the past several years, there has been much research and development towards radio frequency phased arrays for commercial applications such as consumer wireless communications and automotive radars [9].

At optical frequencies, electronically controlled solid-state optical phased arrays have been demonstrated since 1990s with limited capability by either heterogeneous or monolithic integration primarily in custom or dedicated fabrication processes [10]-[21].

In a phased array, to create arbitrary electromagnetic beams with high precision, including creating narrow electromagnetic beams per requirement of many applications, over a wide angular range the phased array antenna elements should be placed closely (ideally within half wavelength), the number of antenna elements should be large, and the phase and amplitude of signal at each antenna element should be controllable. Achieving all of these requirements at optical frequencies has been challenging causing the past demonstrations of optical phased arrays to lack the angular resolution (beam width), spatial coverage (unambiguous steering angle), and flexibility to create various beam patterns as needed in many applications. It is one objective of this invention to demonstrate optical phased arrays that allow small antenna spacing, large number of antenna elements, and accurate control of phase and amplitude at each element, simultaneously.

Over the past several decades, motivated by the consumer demand for electronic applications including personal computers and smartphones, the semiconductor foundry processes, in particular silicon and complementary metal oxide semiconductor (CMOS) processes, have witnessed an exponential growth in performance and integration level. In fact, while the performance and functionality of integrated circuits have improved, their cost has remained nearly constant thanks to semiconductor technology scaling. It is one objective of this invention to demonstrate optical phased array architectures that may be realized in commercial foundry semiconductor processes; hence, benefiting from the same benefits that are offered to the electronic integrated circuits. This would be in contrast to traditional approaches where dedicated processes were developed or used for realization of monolithic optical systems. Monolithic realization of optical phased arrays in commercial foundry semiconductor processes enables incorporating electronic control and calibration schemes to assist and improve the performance and robustness of the optical system.

Monolithic optical phased arrays enable commercial applications including lidar (light/laser detection and ranging) such as those that may be used in advanced driver assistance systems (ADAS) and self-driving cars, three-dimensional cameras such as those that may be used in consumer handheld devices and smartphones, and two- and three-dimensional holographic displays. One objective of this invention is to enable low-cost compact realization of optical phased arrays for diverse range of applications including automotive sensors, consumer 3D imagers, sensors, and 2D and 3D displays.

SUMMARY

In a first embodiment, there is provided an optical communications device. The optical communications device includes a row of optical units, each of the optical units comprising an antenna element and an associated phase shifting element, a first optical power splitter optically coupled to a first optical input/output element, and a first plurality of boundary adjustment elements. In the phased array, each of the first plurality of boundary adjustment units optically couples the first optical power splitter to different sub-rows of the row of optical units, and each of the plurality of boundary adjustment elements includes a sub-row amplitude adjustment element and a sub-row phase shifting element.

In the optical communications device of the first embodiment, each of the different sub-rows can include N of the optical units. Further, the optical phased array can include a controller, and a plurality of digital to analog converters (DACs) communicably coupling the controller to the optical units and the first plurality of boundary adjustment elements. Each of the first plurality of boundary adjustment elements can be associated with a different one of the plurality of DACs, and N of the plurality of DACs can be associated with different sub-rows, where an $i^{th}$ one of the N of the plurality of DACs can be associated with an $i^{th}$ one of the N optical units in each of the different sub-rows.

In the optical communications device of the first embodiment, at least a portion of the plurality of DACs can be non-linear.

The optical communications device of the first embodiment can further include a calibration circuit for monitoring an output at the row of optical units and for generating control signals for at least a portion of the plurality of DACs.

In the optical communications device of the first embodiment, the first optical input/output element can be a second optical power splitter coupled to a second optical input/output element. The transceiver can also further include a second plurality of boundary adjustment elements, where one of the second plurality of boundary adjustment units optically couples the second optical power splitter to the first optical power splitter, and where each of the second plurality of boundary adjustment elements comprises a row amplitude adjustment element and a row phase shifting element.

In the optical communications device of the first embodiment, the second optical input/output element can include a third optical power splitter coupled to a third optical input/output element. The transceiver can also further include a third plurality of boundary adjustment elements, where one of the third plurality of boundary adjustment units optically couples the third optical power splitter to the second optical power splitter, and where each of the third plurality of boundary adjustment elements comprises a sub-array row amplitude adjustment element and a sub-array phase shifting element.

The device of the first embodiment can further include at least one light source optically coupled to the row of optical antenna elements via the first optical power splitter and the first plurality of boundary adjustment elements.

The device of the first embodiment can further include at least one photodetector optically coupled to the row of optical antenna elements via the first optical power splitter and the first plurality of boundary adjustment elements.

In a second embodiment of the invention, there is provided an optical device. The optical device includes an array of optical antenna elements, a first plurality of phase shifters, each of the first plurality of phase shifters associated with different portions of the array of optical antenna elements, a second plurality of phase shifters, each optically coupling one of the optical elements in the array to the associated one of the first plurality of phase shifters, and a plurality of digital to analog converters (DACs) configured for generating control signals for the first plurality of phase shifters and the second plurality of phase shifters. In the transceiver of the second embodiment, each of the first plurality of phase shifters receives the control signals from a different one of a first portion of the plurality of DACs and each of the second plurality of phase shifters receives the control signals from each of a second portion of the plurality of DACs.

The optical device of the second embodiment can further include a controller for controlling the plurality of DACs.

The optical device of the second embodiment can further include a plurality of amplitude adjustment elements associated with each of the first plurality of phase shifters.

In the optical device of the second embodiment, at least one of the plurality of DACs can be non-linear.

In the optical device of the second embodiment, a number of the optical elements can be $N^2$, wherein a number of the first plurality of phase shifters and the second plurality of phase shifters is at least $N^2$, and wherein a number of the plurality of DACs is about 2N−1.

The optical device of the second embodiment can further include a calibration circuit for monitoring an output at the array of optical antenna elements and for generating control signals for at least a portion of the plurality of DACs.

The optical device of the second embodiment can further include at least one light source optically coupled to the array of optical antenna elements via the first plurality of phase shifters and the second plurality of phase shifters. The light source can be a laser.

The optical device of the second embodiment can further include at least one photodetector optically coupled to the array of optical antenna elements via the first plurality of phase shifters and the second plurality of phase shifters.

In the optical device of the second embodiment, the array of optical antenna elements can be a one, two, or n-dimensional array.

The first and second embodiments can be used to form a optical transmitter, receiver, or transceiver. Further, first and second embodiments can be used in a Lidar system, a 3D imager, or any other type of system. Further, the devices of the first and second embodiments can be realized monolithically, such as in an integrated circuit.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps. The numerical values shown on the Figures are for illustrative purposes and should not be construed to be limiting the scope of the invention in any way.

DETAILED DESCRIPTION

Figure 1:
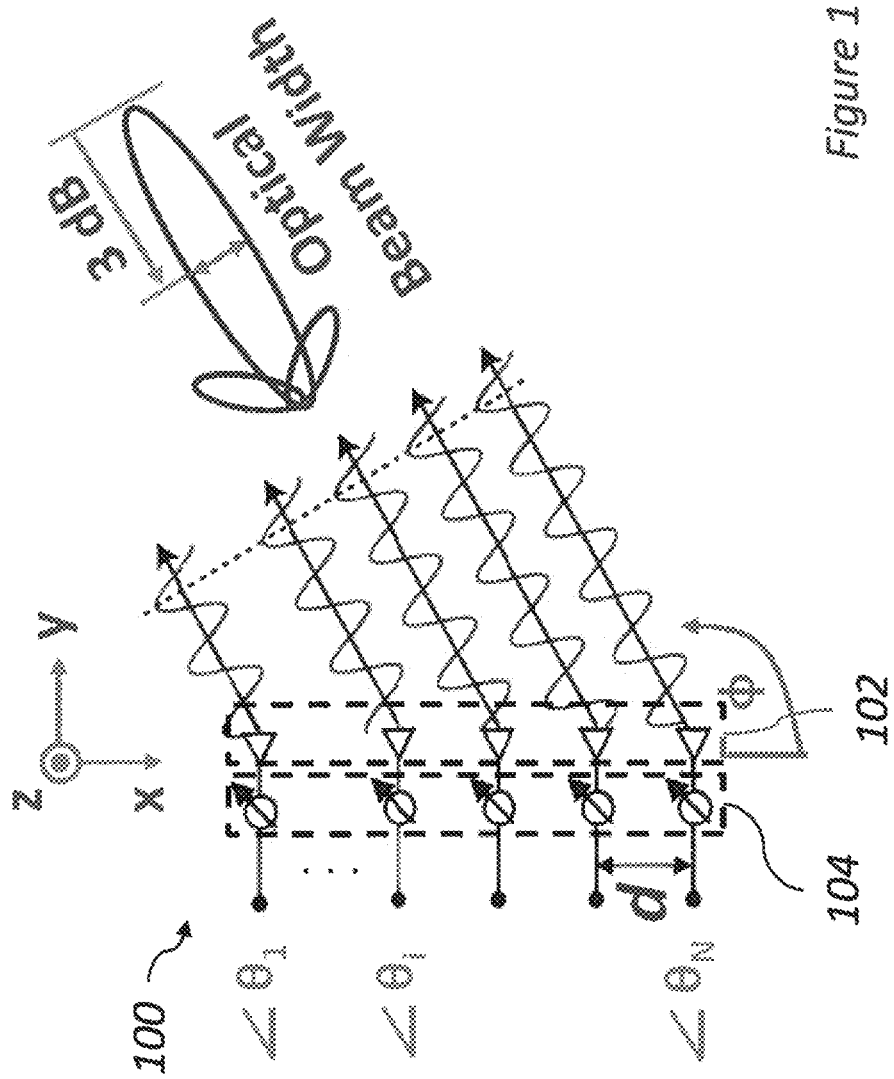
FIG. 1 is a schematic of a one-dimensional optical phased array with N elements that is useful for describing the various embodiments of the disclosure.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognizes that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The various embodiments are directed to an architecture-level solution to surmount the design challenges on realizing a large-scale optical phased array for various applications. Disclosed is a scalable optical phased array based on hierarchical sub-array structure, which extends the array size beyond the conventional limit constrained by a finite optical coherence length. The nested sub-array structure also allows multiple optical variable phase shifters to share the same control electronics. Hence, a very large scale optical phased array with integrated control electronics can be realized in orders of magnitude smaller silicon footprint compared to the size of conventional optical phased array realizations. The architecture-level design technique of the various embodiments is platform-independent and thus can be applied to different monolithic integration platforms such as those based on electronic or photonic silicon-on-insulator (SOI) technology, standard CMOS technology, thick SOI technology [40], silicon nitride technology [26], GaN silicon photonics [41], compound semiconductor technologies such as those based on indium phosphide (InP) and gallium arsenide (GaAs), and hybrid-integrated semiconductor platforms. Furthermore, the architectural innovations and various embodiments are independent of wavelength, and may be applied to optical signals at visible wavelengths, short-wave infrared (SWIR), mid-wave infrared (MWIR), long-wave infrared (LWIR), etc. The choice of wavelength often depends on the application, and may impact the technology platform.

A large-scale implementation of an optical phased array has seen strong demand in order to satisfy the need of high beam resolution and wide beam steering range in sensors and imagers that are used in applications such as ADAS, self-driving cars, drones, 3D cameras, and displays. As discussed below in greater detail, shaping a narrow optical beam for high-resolution steering typically requires a large antenna array while wide beam steering requires a narrow antenna pitch comparable to the short optical wavelength of electromagnetic radiation through the antenna array. However, as the number of array elements grows, electronic control signal routing for variable optical phase shifters occupies increasingly larger area.

Monolithic integration platforms based on SOI or bulk silicon substrate have a potential to economically realize a large-scale optical phase array in a compact form factor. However, device mismatch due to process non-uniformity [22]-[24] is a fundamental limiting factor preventing the realization of a monolithically integrated large-scale optical phased array with a conventional architecture. The impact of device mismatch not only introduces electronic performance variation to MOSFETs but also optical performance variation to optical waveguides and optical modulators. The need of electro-optical calibration circuitry [25], which mitigates such undesirable impacts of mismatch, significantly increases the complexity of a large-scale optical phased array. A monolithically integrated very large-scale optical array with a small antenna pitch therefore does not exist. Previous large-scale optical phased arrays with 4096 antennas [13] and 1024 antennas [26] are static without ability to steer an optical beam to a desired location. The largest tunable optical phased array reported to date [21] has only 128 array elements.

This various embodiments of the present invention are directed a large-scale optical phased array architecture leveraging a hierarchical sub-array structure. As a specific embodiment, design details and performance of a monolithically integrated 1024-element optical phased array prototype, operating at the 1550 nm wavelength, in a commercial foundry SOI CMOS process are also presented. The architecture of the various embodiments is independent of any specific monolithic integration platform, wavelength, and specifications for beam-width and maximum steering angle, and allows the sharing of control electronics among multiple variable optical phase shifters, so that compact silicon implementation is allowed with relatively simple metal interconnections for control electronics. The design parameters of the proposed architecture are determined based on the quantifiable impact of optical device non-idealities on the system level performance of optical phased arrays.

Typically, the beam steering range and beam width of monolithically integrated large-scale optical phased arrays are limited by factors including effective antenna aperture size, device mismatch, optical crosstalk, and noise. Conventional optical phased array performance limitations, such as beam steering range and beam width, can be illustrated with respect to a one-dimensional uniform array, such as that depicted in FIG. 1.

FIG. 1 is a schematic of a one-dimensional optical phased array 100 with N elements that is useful for describing the various embodiments of the disclosure. As shown in FIG. 1, the N element array consists of N antennas 102 fed by N modulators 104. The modulators 104 can modulate amplitude, phase, or both. In the special case of a uniform phased array, the distance between two adjacent antennas is a constant d. In a standard beam forming scheme, the modulators 104 can be configured such that each of the antennas 102 radiates the same power with a linear phase progression across the uniform array 100.

The unambiguous optical beam steering range in radian unit for a uniform array, operating at wavelength $\lambda$, is the range of azimuthal angle deviation $\Delta\Phi$ from the broadside radiation in yz-plane where there are no grating lobe is bounded by $$-\sin^{-1}\left(\frac{\lambda}{2d}\right) < \Delta\phi < \sin^{-1}\left(\frac{\lambda}{2d}\right). \tag{1}$$

A complete ±90° unambiguous beam steering range is achieved with a half-wavelength ($\lambda/2$) antenna pitch. Given the short wavelength of optical frequencies, the antenna pitch must be extremely small to enable a meaningful steering range. For instance, if an unambiguous azimuthal steering angle of at least ±35° is necessary, the antenna pitch of an optical phased array operating at the 1550-nm wavelength should be less than 1350 nm.

The width of the main lobe at the half-power level of the array radiation intensity represents the optical beam resolution. The beam width of the uniform array is narrowest with the broadside radiation ($\Phi=90°$) and broadens as the steering angle increases towards the end-fire:

$$\Delta\bar{\phi}_{3dB} = \frac{c_1}{\sin\phi_0}\frac{\lambda}{Nd} \tag{2}$$

where the constant $c_1$ is the solution of $\sin(\pi x)/x=\pi/\sqrt{2}$, which is often approximated to 0.886, and $\Phi_0$ is the beam steering angle. This expression shows that a relatively large effective array aperture size Nd, compared to the wavelength $\lambda$, is desirable in order to achieve a narrow beam width. High-resolution three-dimensional sensing requires a very fine spatial resolution. For instance, the resolution of a phased array lidar for automotive applications may need to be better than 0.1° for object identification at or beyond 100 m, which in turn requires more than 689 antennas with the 1350 nm pitch for ±35° beam steering. To meet this requirement, 0.08° beam width at the broadside is necessary, which achieves 0.1° beam width with ±35° steering angle.

Table I exemplifies the beam steering range and the minimum 3-dB beam width of example uniform phase array configurations with isotropic antennas with 1550-nm wavelength.

TABLE 1

BEAM STEERING RANGE AND MINIMUM BEAM WIDTH OF UNIFORM OPTICAL PHASED ARRAY WITH ISOTROPIC ANTENNAS

| Number of Antennas | Antenna Spacing[1] | Steering Angle | Min. Beam Width |
|---|---|---|---|
| 100 | $2\lambda$ | ±13.5° | 0.254° |
| 100 | $\lambda$ | ±30.0° | 0.508° |
| 100 | $\lambda/2$ | ±90.0° | 1.016° |
| 1,000 | $2\lambda$ | ±13.5° | 0.025° |
| 1,000 | $\lambda$ | ±22.5° | 0.051° |
| 1,000 | $\lambda/2$ | ±90.0° | 0.102° |

[1]$\lambda$ is the radiation wavelength from the optical phased array.

It is possible to realize a phased array with nonuniform antenna spacing. The beam-width or resolution of a nonuniform phased array may be different than that of a uniform phased array. The embodiments of this invention may be applicable to uniform phased arrays, nonuniform phased arrays, or both.

Effective Antenna Aperture Size

The effective antenna aperture size N×d not only determines the minimum chip size but also sets the beam width as in Equation (2). A desirable design goal for a given effective antenna aperture size N×d is therefore to maximize a quantity $\kappa=2|\Delta\phi|/\Delta\phi_{3dB}$, intending to have a large unambiguous beam steering range by having a small beam width. For an antenna pitch larger than $\lambda/2$, this quantity $\kappa$ can be approximated to N/d by using a Taylor series expansion of Equation (1) and taking the largest steering angle $\psi_0=|\Delta\Phi|$. This analysis agrees with intuitive expectation that a small antenna pitch d is desirable for a given number of antennas N.

Figure 2:
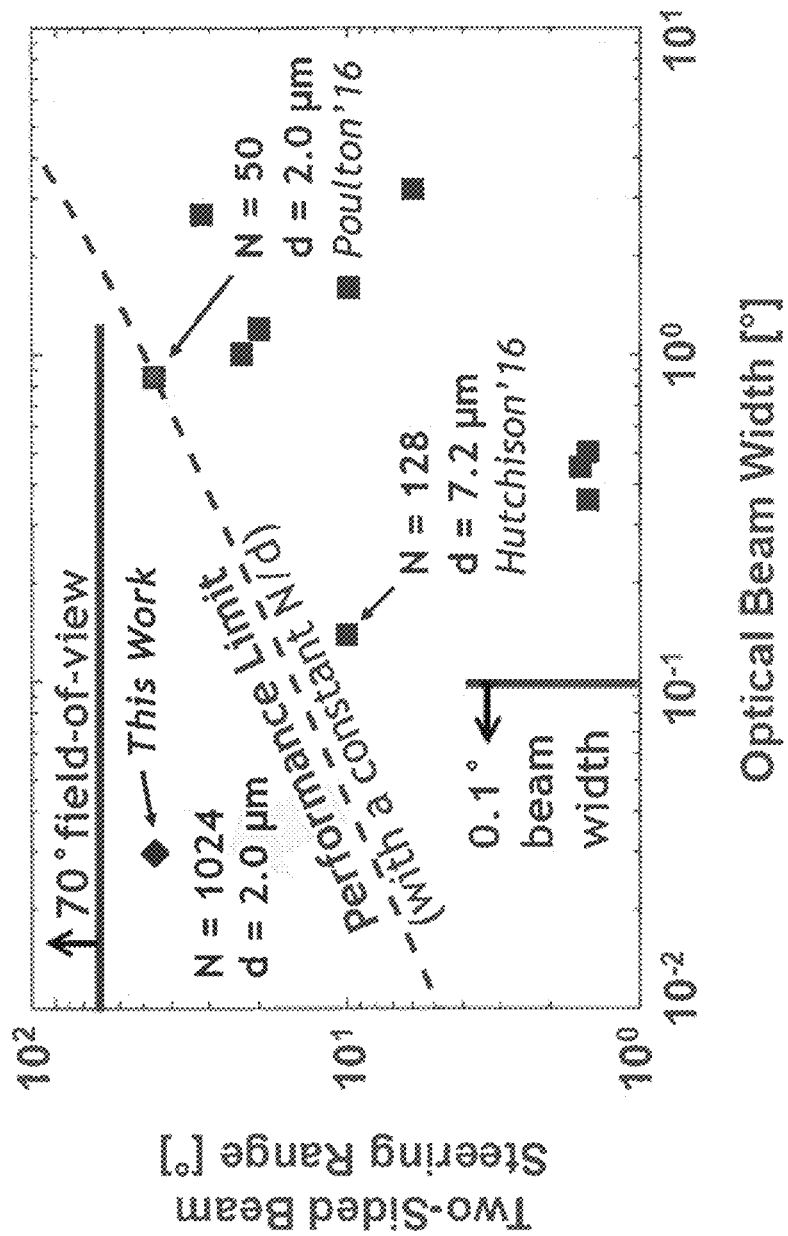
FIG. 2 exemplifies a design trade-off between beam steering range and beam width for a constant N/d where N is the number of antennas and d is the antenna pitch in a uniform optical phased array.

FIG. 2 visualizes the trade-off between beam steering range and beam width for the largest value of $\kappa \approx N/d$ from [21], showing the best performance of past demonstrations of monolithically integrated optical phased arrays is orders of magnitude worse than what is needed for many applications such as automotive phased array lidar.

Mismatch

Fabrication non-uniformity, which is caused by uncertainties in fabrication process parameters such as silicon etching rate, thermal oxidation growth rate, mask alignment position, and photoresist thickness, introduces mismatch among integrated devices [24]. With micrometer-scale short wavelength in optical frequencies, mismatch lead to a random phase error in optical waveguides. This random phase error does not average out; but, it takes a random walk with its mean-square value increasing with waveguide length [27].

When a coherent light with a wavelength $\lambda$ propagates in a waveguide of length L, the random phase error is given by $$\Delta\phi(L) = 2\pi \int_0^L \left(\frac{\lambda}{\Delta n_e(l)}\right)^{-1} dl = \frac{2\pi}{\lambda} \int_0^L \Delta n_e(l) dl, \quad (3)$$

where $\Delta n_e$ is the deviation of an effective refractive index from its average value for an infinitesimal section of the waveguide at location x=l. Note that $\lambda/\Delta ne(l)$ in the integral corresponds to the deviation of light travel distance within the infinitesimal section and is normalized to the wavelength of the light propagating within the waveguide core.

Optical phase coherence length is a parameter to quantify the random phase error in optical waveguides. The laser community defines the optical phase coherence length $L_{coh}$ such that the following relation on the expectation of the random phase error holds [28], [29], $$E[e^{i\Delta\phi(L)}] = \int_{-\infty}^{\infty} f_{\Delta\phi}(x) e^{ix} dx = e^{-L/L_{coh}} \quad (4)$$

where the probability density function $f\Delta\phi(x)$ on the random phase error is a Gaussian distribution with zero mean and standard deviation $\sigma$. This definition indicates that, with a Mach-Zehnder Interferometer (MZI) consisting of two identical waveguides with a length $L=L_{coh}$ as illustrated in FIG. 3, the average intensity at the MZI output is lower than the input light intensity by a factor of $(1+e^{-1})/2 \approx 0.6839$. To suppress such random intensity decrease below 1 dB, the waveguide length should be shorter than $L_{coh}/2$. This definition can be used to show that the root-mean-square of the random phase error $\Delta\rho(L)$ is given by $\sqrt{2L/L_{coh}}$ [27], which finds that an optical waveguide with $L=L_{coh}/2$ introduces approximately 60° root-mean-square phase error between the two waveguides of the MZI.

As a special case, let us consider the optical phase coherence length in silicon photonics technology platforms [23], [24], [30]-[32]. First, the typical optical phase coherence length in modern silicon photonics technologies based on SOI wafer is known as 4-5 mm [24]. This means that, in order to suppress the intensity variation of an MZI with two identical waveguides less than 3 dB, the waveguide length should be less than approximately 1.5 mm. Second, interestingly, optical phase coherence is loosely related to the waveguide insertion loss [24], [30]. Third, when optical waveguides are close to each other within 700-1000 μm distance [23], [24], [32], it is commonly observed from a wafer-level characterization of optical ring resonators and MZIs that the refractive index of the optical waveguide core material has statistically strong correlation. In other words, the accumulated random phase errors of geometrically close waveguides are negligible. Due to this spatial correlation, optical phase coherence is typically measured using an MZI whose two waveguide legs are separated by more than 1 mm.

Figure 3A:
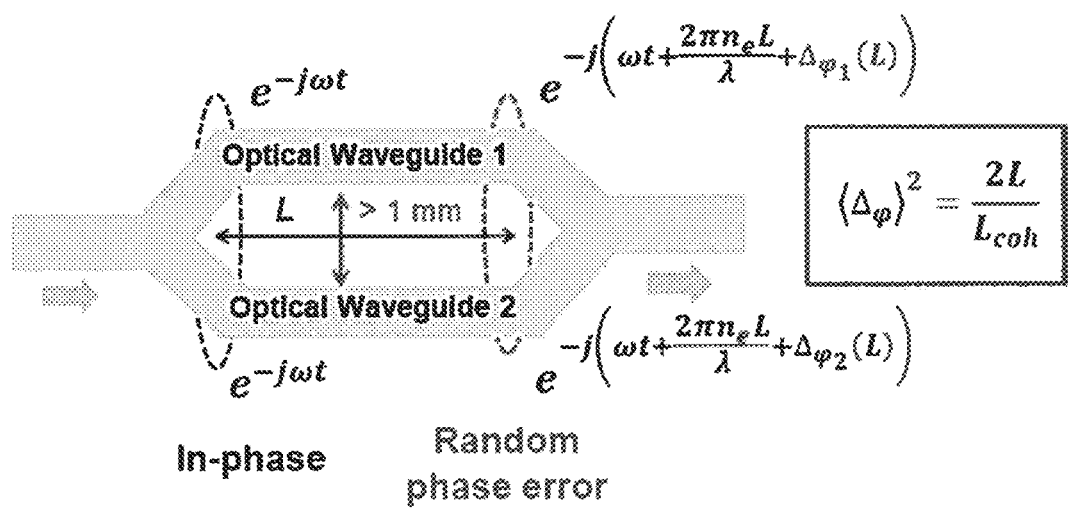
FIG. 3A schematically illustrates how an optical phase coherence length causing relative random phase errors on optical waveguides, which adversely affects the side-lobe level of optical phased arrays with a long waveguide antenna feed.
Figure 3B:
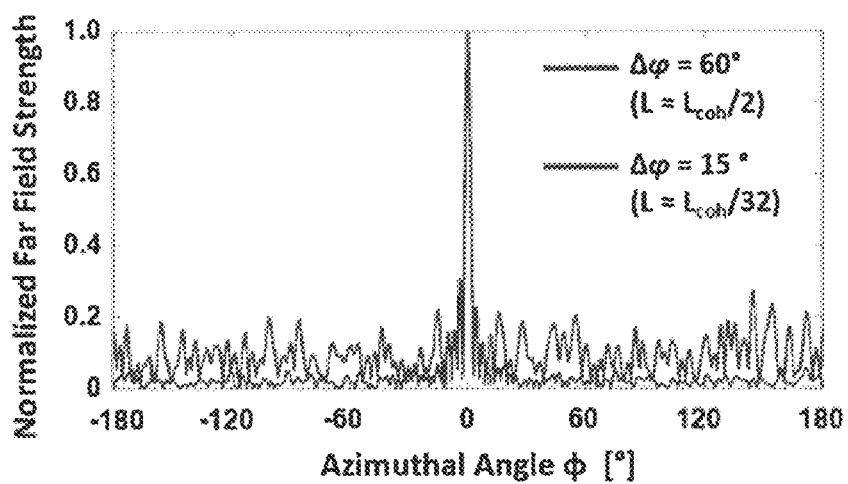
FIG. 3B shows behavioral simulation results on the impact of random phase error on a 128-element uniform array with λ/2 antenna pitch.
Figure 4:
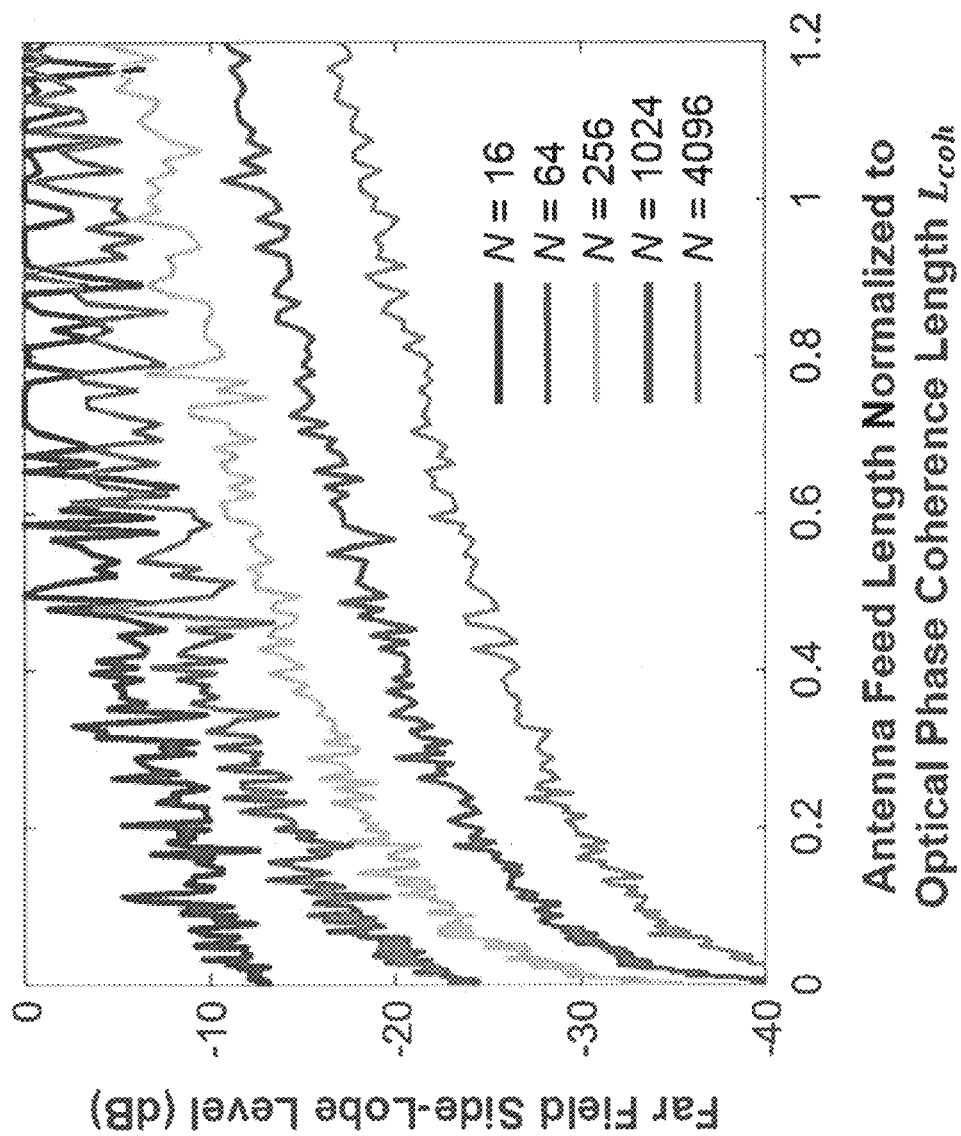
FIG. 4 illustrates a limit of side-lobe level in a uniform optical phased array with N elements due to finite optical coherence length.

In a large-scale optical phased array, the antenna feed consists of a large number of long optical waveguides that run in parallel from variable optical phase shifters to antennas, and thus accumulated random phase error within the long waveguides should be considered. This is illustrated in FIGS. 3A and 3B. FIG. 3A schematically illustrates how an optical phase coherence length causing relative random phase errors on optical waveguides, which adversely affects the side-lobe level of optical phased arrays with a long waveguide antenna feed. FIG. 3B shows behavioral simulation results on the impact of random phase error on a 128-element uniform array with $\lambda/2$ antenna pitch. The simulation results exhibit that 60° random phase error from an antenna feed with a length of $L_{coh}/2$ increases the side-lobe power level to −10 dB. Additional behavioral simulations show that the random phase error has little impact on beam steering and beam width. Simulation results (as shown in FIG. 4) also shows that the number of array elements affects the impact of the random phase error on the side-lobe level. To avoid the side-lobe level degradation, static phase calibration is necessary to each array element.

When fabricated using conventional architectures, an optical phased array has a limited scalability with monolithic integration primarily due to control electronics and finite optical phase coherence length. Optical phase coherence length sets the fundamental limit on the scalability of electronically tunable optical phased arrays in conventional architecture. The most compact realization of an array element (consisting of a 360° optical variable phase shifter, an optical variable amplitude adjuster, and an optical antenna) for a two-dimensional optical phased array in a monolithic integration platform is approximately 30 μm by 30 μm [19]. If the technology provides an optical phase coherence length $L_{coh}$ of 4 mm, 64 array elements with the 30-μm pitch need 1920-μm length waveguides for optical interconnects, corresponding to $0.48L_{coh}$. As discussed below, this results in 57° root-mean-square random phase error accumulation, leading to a side-lobe level greater than −10 dB as shown in FIG. 4. For a larger 128-element array with the same pitch, the side-lobe power level further grows to approximately −7 dB level since the waveguide length doubles to $0.96L_{coh}$. This is a significant limitation in array size scalability with conventional array architecture.

Figure 5:
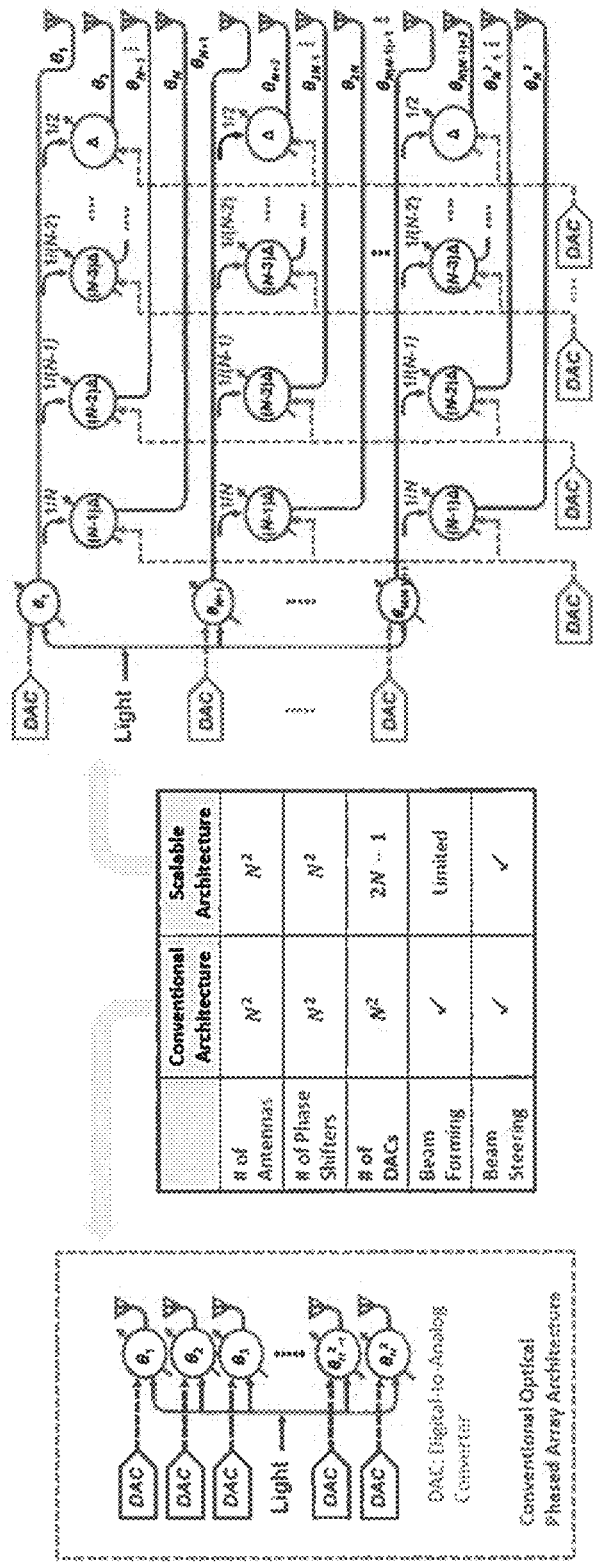
FIG. 5 illustrates a scalable optical phased array architecture, which reduces the silicon footprint of control electronics from $O(N^2)$ to $O(N)$ for a one-dimensional uniform array with $N^2$ elements, in an ideal monolithic integration technology with infinite optical phase coherence length.

In view of the foregoing limitation in conventional architectures for optical phased arrays, the various embodiments of the present invention are directed to a scalable optical phased array architecture for monolithic integration. In this architecture, $N^2$ optical variable phase shifters can be controlled by using O(N) DACs in an $N^2$-element optical phased array for linear beam steering, while overcoming array scalability limitation due to finite optical phase coherence length. FIG. 5 compares the architecture of the various embodiments (right) versus a conventional architecture (left).

In the architecture of the various embodiments, the $N^2$ variable phase shifters are placed in an N×N array. To briefly introduce the key ideas for implementing this architecture, infinite optical phase coherence length is assumed. The idea behind the architecture of the various embodiments is to create a linear phase progression between adjacent columns, and also between the rows. The N−1 variable phase shifters in each column are in-sync and driven by a single column-control current DAC. The relative phase shifts between the rows are set by N variable phase shifters at the beginning of each row. In each row, cascaded couplers with progressively increasing coupling ratio are used to equally distribute the optical signal to all the row variable phase shifters. The reduced number of required DACs from $O(N^2)$ to $O(N)$ with $N^2$ array elements can increase the number of array elements in an example 36 mm×24 mm SOI CMOS chip from 360 to 1.3 million or reduce the chip area for an example 360 element phased array from 864 $mm^2$ to 46 $mm^2$. To further reduce the silicon area requirement for control electronics, nonlinear DACs may be used in certain embodiments, as discussed below in further detail.

Figure 6:
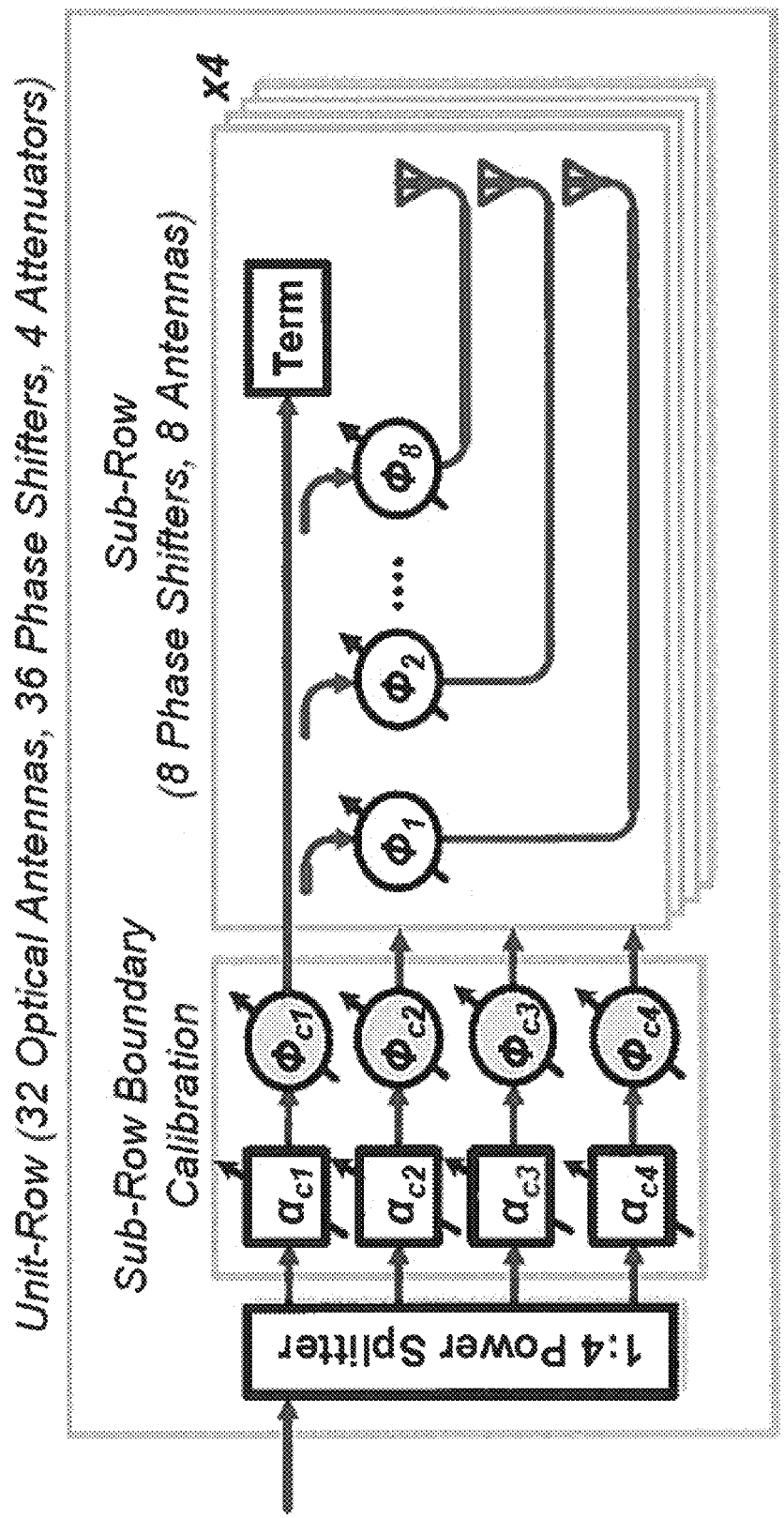
FIG. 6 illustrates a 32-element example of sub-array architecture to overcome limitation from finite optical phase coherence length.

FIG. 6 shows a schematic illustrating of the proposed sub-array structure according to the present invention that overcomes the array size limitation of conventional architectures due to finite optical phase coherence length. The sub-array consists of multiple optical variable phase shifters whose input is equally split from the common optical input port using cascaded optical directional power couplers. In particular, the sub-array structure consists of first dividing the optical antennas and their associated phase shifters into groups. For example, as shown in FIG. 6, 32 antennas and their associated phase shifters being fed by a light source are divided into 4 sub-rows of 8 antennas and their associated phase shifters. As previously described with respect to FIG. 5, each phase shifter $\phi_n$, where n=1, 2, . . . 8, would be controlled by a same DAC. However, to calibrate or adjust for possible imperfections in each group, a boundary calibration or adjustment is performed. For example, for each of the sub-rows of FIG. 6, a sub-row boundary adjustment is performed for account for sub-row mismatches by feeding each sub-row using an independent phase shifter ($\phi_{ci}$) and amplitude adjuster ($\alpha_{ci}$). In the various embodiments, the amplitude adjuster can be used to attenuate and/or amplify amplitude.

Figure 7:
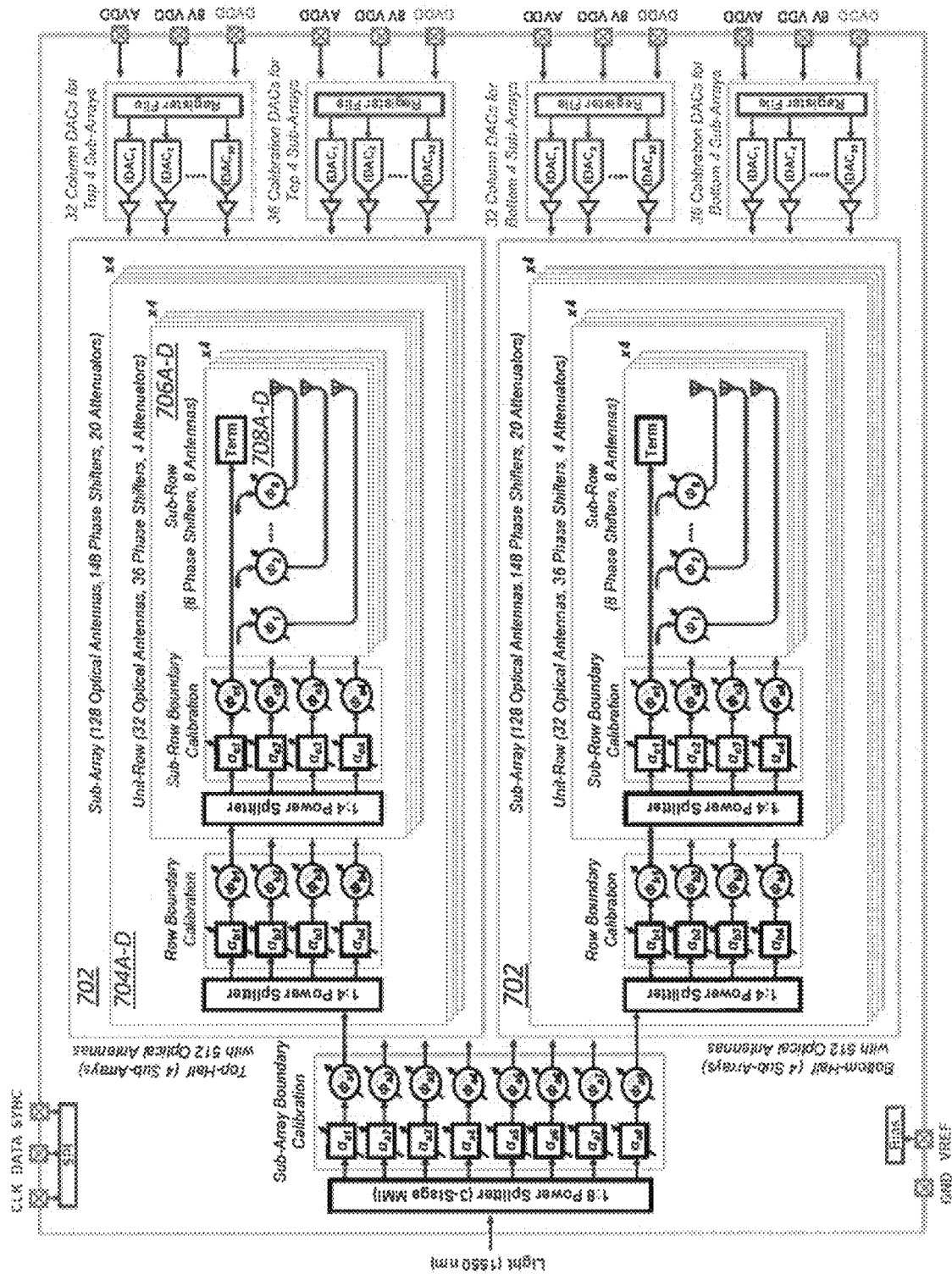
FIG. 7 illustrates a proposed scalable architecture with 1024 array elements, overcoming the array size limitation due to finite optical phase coherence length by exploiting a hierarchically nested sub-array structure.

FIG. 7 illustrates an exemplary embodiment of the scalable optical phased array according to the present invention, where there are 1024 elements for monolithic integration platforms with finite optical phase coherence length. In the embodiment of FIG. 7, three levels of nested sub-array structures are used to calibrate out both random phase error due to finite optical phase coherence length and static phase error due to systematic optical path difference. The same process of division and boundary calculations, as illustrated in FIG. 6, is used.

First, as shown in FIG. 7, the 1024-element array is divided into two main sub-arrays 702A (top half) and 702B (bottom half) with 512 elements each. Each of these sub-arrays 702A and 702B is then divided further. For example, as shown in FIG. 7, sub-array 702A is divided into 4 top-level sub-arrays 704A-704D of 128 elements each. Each top-level sub-array is then divided into unit rows. For example, as shown in FIG. 7, each of sub-arrays 704A-704D is divided into 4 unit rows 706A-706D of 32 elements each. Each unit row is further divided. As in FIG. 7, each of the unit rows 706A-706D is divided into 4 sub-rows 708A-708D of 8 elements each.

In addition to the 1024 optical variable phase shifters connected to 1024 optical antennas, 168 other optical variable phase shifters and 168 other optical variable amplitude adjusters controlled by additional 72 DACs, are used to manage process variation between sub-arrays, unit rows, and sub-rows as well as static optical path differences. As discussed above a same DAC can be used to control phase shifters at a same level. Further, each time that a common input is split (e.g., main array to sub-arrays, sub-array to unit row, unit row to sub-row, a boundary calibration is provided calibrates the phase offsets among rows or arrays in to the next level of the hierarchy. Hence, the input-output relation of a row or array is consistent regardless of the optical waveguides connecting a lower sub-row or sub-array even beyond the optical phase coherence length.

The proposed architecture takes the advantage of spatial correlation by closely placing multiple sub-arrays. In the specific example presented, each row has 32 elements that are placed in a horizontal direction. Thus, the achievable vertical size of the row is significantly smaller than the achievable horizontal size, so that the overall vertical size of the sub-array is still smaller than the horizontal size of a row as well as optical phase coherence length. Therefore, all 4 optical variable phase shifters in one of 32 columns in a sub-array can be driven by the same DAC.

The 8 top-level sub-arrays are divided into two groups each with 512 elements such that the vertical size of each group (4 top-level sub-arrays) is smaller than the optical phase coherence length.

Optical Waveguide

The optical waveguides, which route optical signals in this invention, may be realized in a variety of techniques such as strip dielectric waveguides, ridge dielectric waveguides, subwavelength waveguides, and plasmonic waveguides.

Dielectric waveguides are often used in monolithic optical integrated circuits. For instance, silicon waveguides may be used in the infrared wavelength range. The waveguide dimension affects the allowable propagating electromagnetic modes as well as their velocity and loss. In a given semiconductor process, where the thickness of various layers are fixed, the waveguide width may be appropriately selected as a degree of freedom for a given set of specifications.

One embodiment of optical waveguides may be based on surface plasmon-polariton (SPP) wave propagation. Plasmonic waveguides can be implemented by using Al and Cu metals that are fully compatible with commercial CMOS foundries. Plasmonic waveguides have relatively higher loss, but may provide advantage of compact physical footprinting when the plasmonic waveguides are locally used to reduce the impact of higher optical loss. For example, with 1550-nm wavelength, [43] reported a design of straight plasmonic waveguides (using CMOS foundry compatible metals) that allow 10 nm separation among adjacent waveguides, which consequently allows dense waveguide array routing near optical phased array antenna feeds. Plasmonic bend waveguides can be realized with a radius as small as 500 nm, and can be used to allow a compact realization of plasmonic ring modulators.

Optical Directional Coupler

For large-scale optical phase array embodiments with dense optical waveguide routing, optical directional couplers split and combine optical power, allowing the most compact realization of sub-array structure among classical passive optics devices.

Figure 8A:
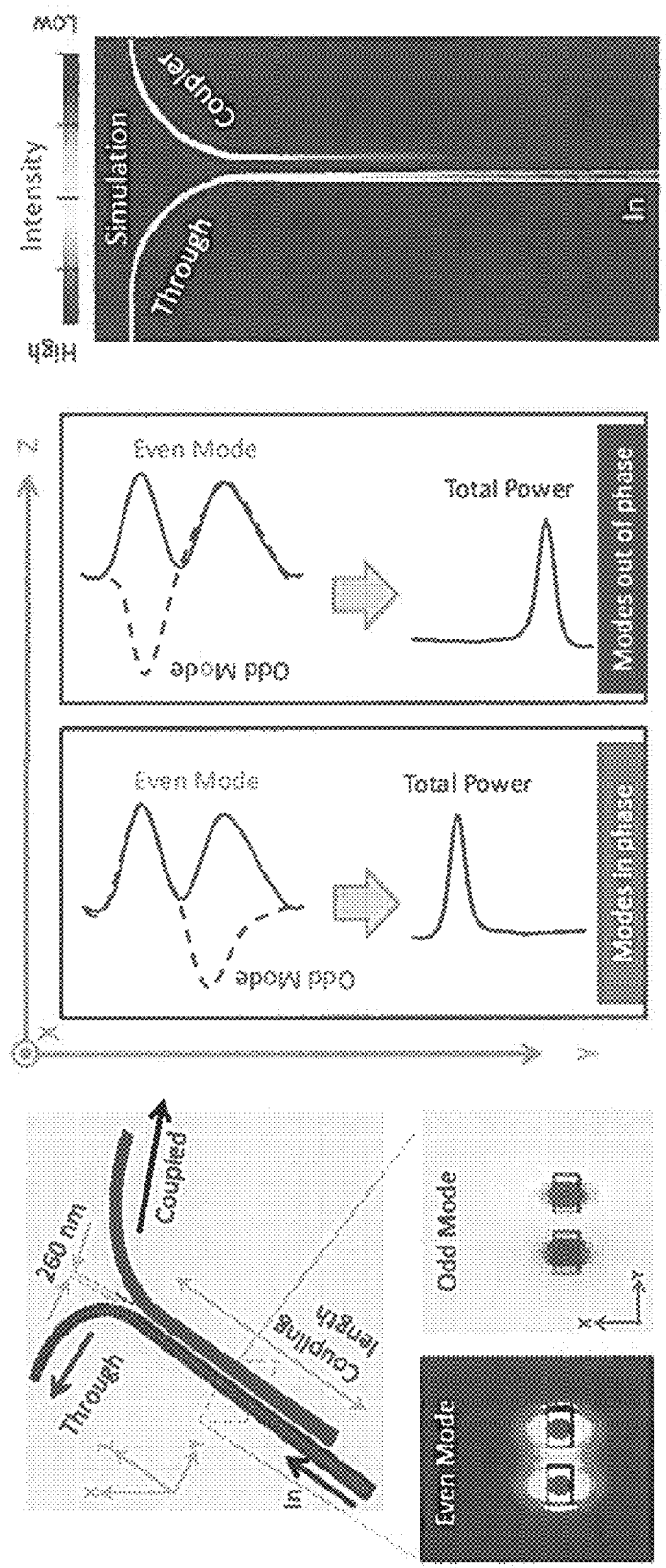
FIGS. 8A and 8B illustrates an optical directional coupler in the monolithic integration platform.

FIG. 8A shows one exemplary embodiment for a optical directional couplers designed to distribute optical signal to phase shifters in an array according to the present invention. The coupling length $L_c$ is the length of the region where the two waveguides are closet to each other, which determines how much optical power is transferred from one waveguide to the other. Up to the length $L_\pi$, at which complete power transfer occurs, the longer the coupling length, the more optical power is transferred to the output port. The optical power coupling ratio $\kappa_c$ is obtained from coupled mode theory [35] as, $$\kappa_c = \sin^2\left(\frac{\pi}{2}\frac{L}{L_\pi}\right), \quad (5)$$

and $L_\pi$ is a function of the gap g between the two waveguides given by $L_\pi = c_1 e^{-c_2 g}$.

Figure 8B:
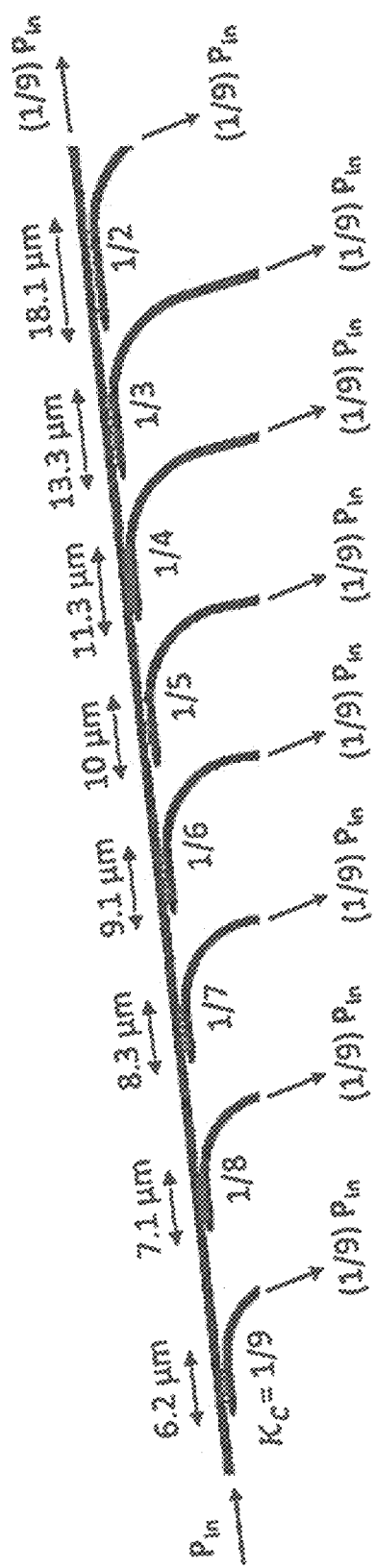

To distribute an optical input signal to multiple optical variable phase shifters in an array, multiple optical power couplers are cascaded in series, as shown in FIG. 8B. As the number of the phase shifters increases, the optical directional couplers need to tap relatively smaller amount of optical power, which in turn requires a shorter coupling length. As the coupling length $L_c$ gets smaller and approaches the technology grid size $\Delta_0$, the deviation of the power coupling ratio from a desired value increases due to the technology grid size limitation. Such power coupling ratio error $e_c$ is obtained as $$e_c = \left|1 - \left[\sin^2\left(\frac{\pi\Delta_0\lfloor L_c/\Delta_0\rfloor}{2c_1 e^{-c_2 g}}\right)\bigg/\sin^2\left(\frac{\pi L_c}{2c_1 e^{-c_2 g}}\right)\right]\right|. \quad (6)$$

where $c_1$ and $c_2$ are constants, which depend on the waveguide geometry and wavelength. FIG. 10(c) shows that the power coupling error $e_c$ fluctuates and the peak error gradually increases as the coupling length $L_c$ gets shorter.

Optical Variable Phase Shifter

The optical variable phase shifter may be realized using electro-optic, thermo-optic, acousto-optic, or other effects. A phase shifter may be realized by modifying the propagation velocity or distance. Propagation velocity is related to the effective refractive index of the medium, and may be adjusted thermally, electrically, acoustically, etc. For instance, refractive index may be a function of temperature or the carrier density or electric field—all of these may be adjusted using electrical stimuli.

Figure 9A:
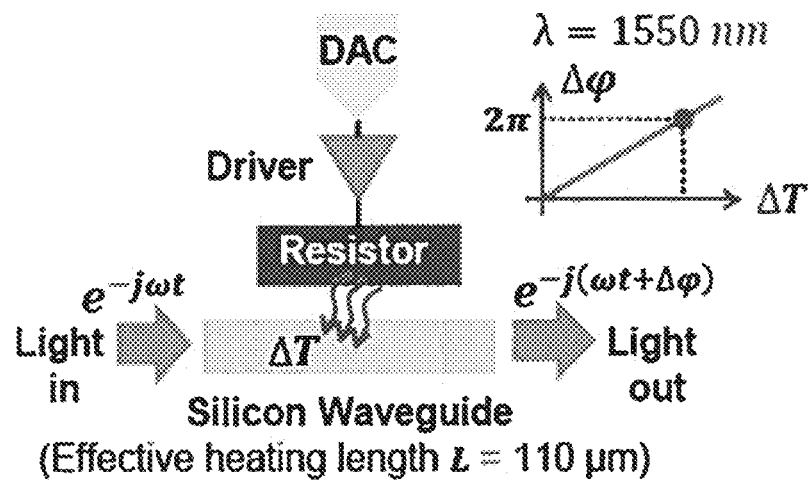
FIG. 9A illustrates an optical variable phase shifter designed in the monolithic integration platform with thermo-optic phase modulation mechanism.
Figure 9B:
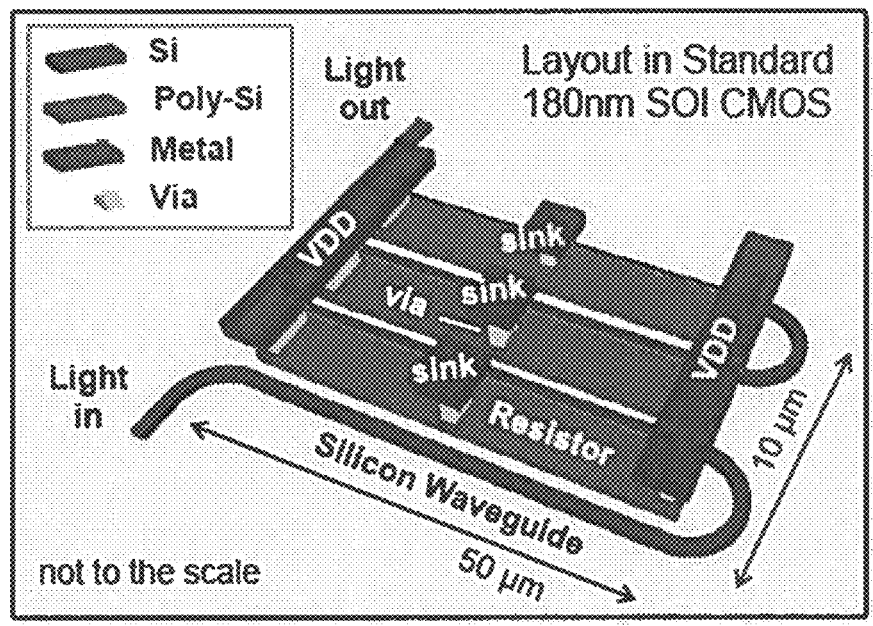
FIG. 9B illustrates an optical variable phase shifter designed in the monolithic integration platform with a physical layout of the optical variable phase shifter.
Figure 9C:
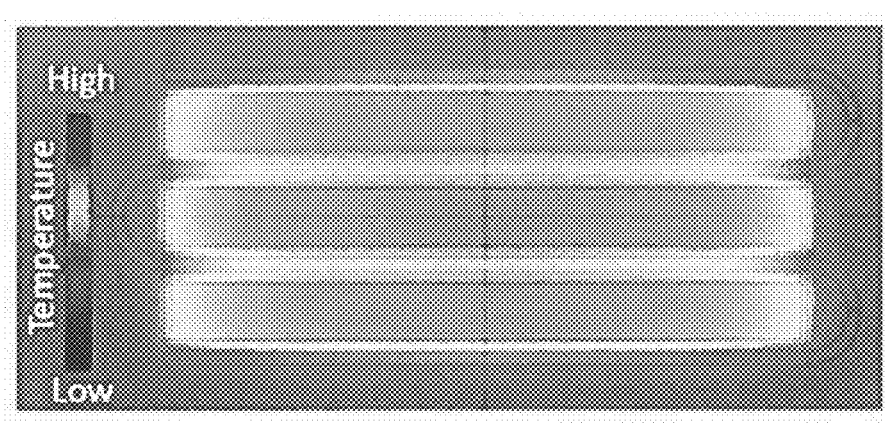
FIG. 9C illustrates an optical variable phase shifter designed in the monolithic integration platform with a simulated temperature profile.
Figure 10:
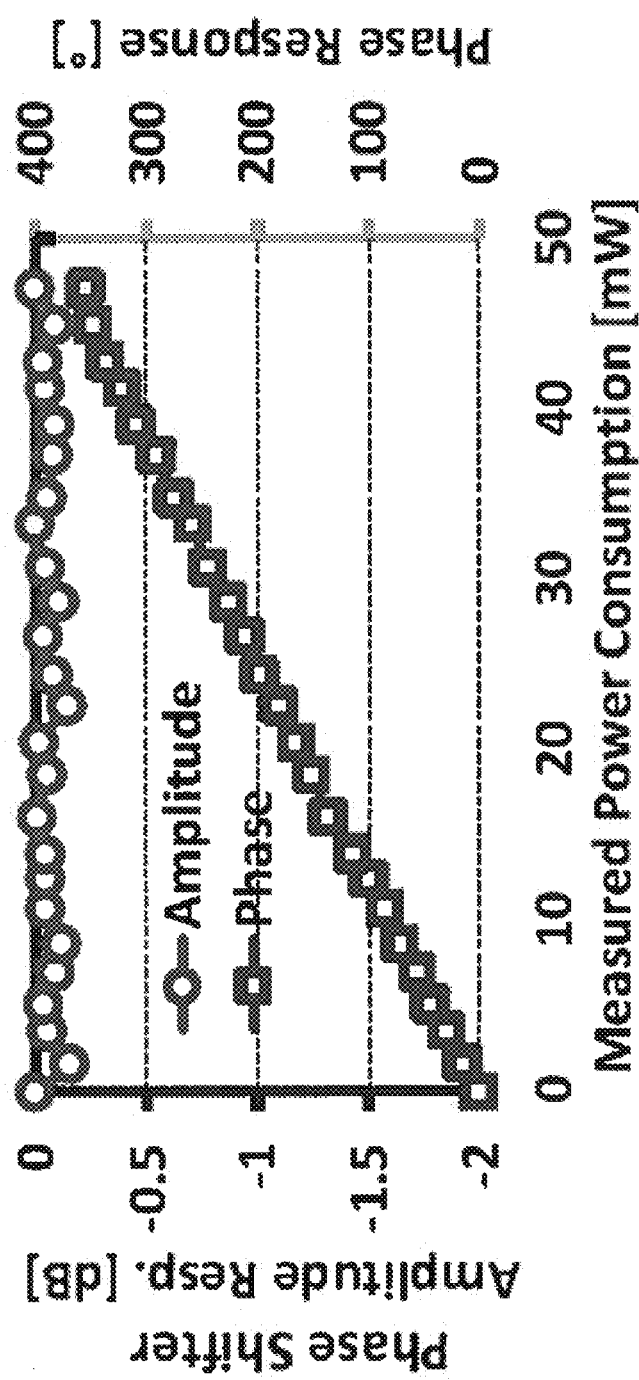
FIG. 10 illustrates a microphotograph and measured response of the optical variable phase shifter at 1550-nm wavelength from an MZI-based standalone characterization structure.

In certain embodiments, the optical variable phase shifters can be based on thermo-optic effect. This is schematically illustrated in FIG. 9A. As shown in FIG. 9A, the input light is delayed in proportion to the temperature rise $\Delta T$ of the waveguide where the light is traveling. Flowing a current into a conductor strap—a polysilicon strap in one embodiment—near the waveguide realizes an electrically controlled heater to introduce the temperature rise. The phase shift $\Delta\phi$ added to the input light can be approximated [36] as $$\Delta\phi \simeq \frac{2\pi L'}{\lambda}\frac{dn}{dT}\Delta T, \quad (7)$$

where L' is the length of the phase shifter and dn/dT is the sensitivity of refractive index to temperature change. For instance, dn/dT in silicon is approximately $1.84\times10^{-4}$ K$^{-1}$ for 1550-nm wavelength. FIG. 9B shows an exemplary embodiment for an optical variable phase shifter according to the various embodiments designed for an example 1024-element array. In this design, the silicon waveguide can be folded into multiple segments surrounding multiple heaters leading to higher thermal efficiency compared to a straight structure. The temperature profile of an example thermal phase shifter, obtained from 3D finite-element method (FEM) simulations, shows heat delivery from the heater to the surrounding silicon waveguide (FIG. 9B). FIG. 10 shows the measured response of this example optical variable phase shifter.

Optical Variable Amplitude Adjuster

The amplitude adjuster may be realized as a variable gain element or a variable attenuator element. One advantage of realization of amplitude adjuster as a variable attenuator is that it can be bidirectional—that is, the optical signal can flow from either port to another port. This bidirectionality, coupled with the bidirectionality of passive variable phase shifters, enables realization of bidirectional optical phased arrays that may be used in a transmitter, a receiver, or a transceiver. Another advantage of realization of amplitude adjuster as a variable attenuator is that it can be realized in a commercial foundry silicon process. One advantage of realization of amplitude adjuster as a variable gain element is that the optical signal may be amplified which in turn may result in higher sensitivity of a receiving phased array or a higher output power in a transmitting phased array. Most realizations of optical variable gain elements require compound semiconductors that are either incompatible to the standard commercial foundry silicon process or add to its cost.

In one embodiment, variable amplitude adjuster may be based on changing the concentration of carriers in the waveguide where light is propagating through applying a control voltage. For instance, a PN or PIN structure may be used to realize a variable attenuator.

Figure 11A:
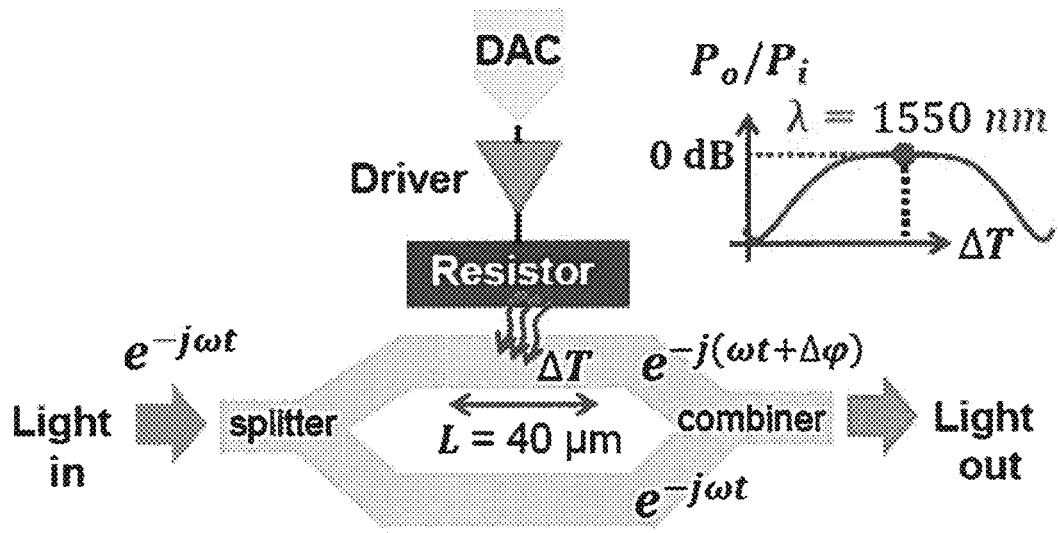
FIG. 11A illustrates an optical variable attenuator designed in the monolithic integration platform with a thermo-optic intensity modulation mechanism.
Figure 11B:
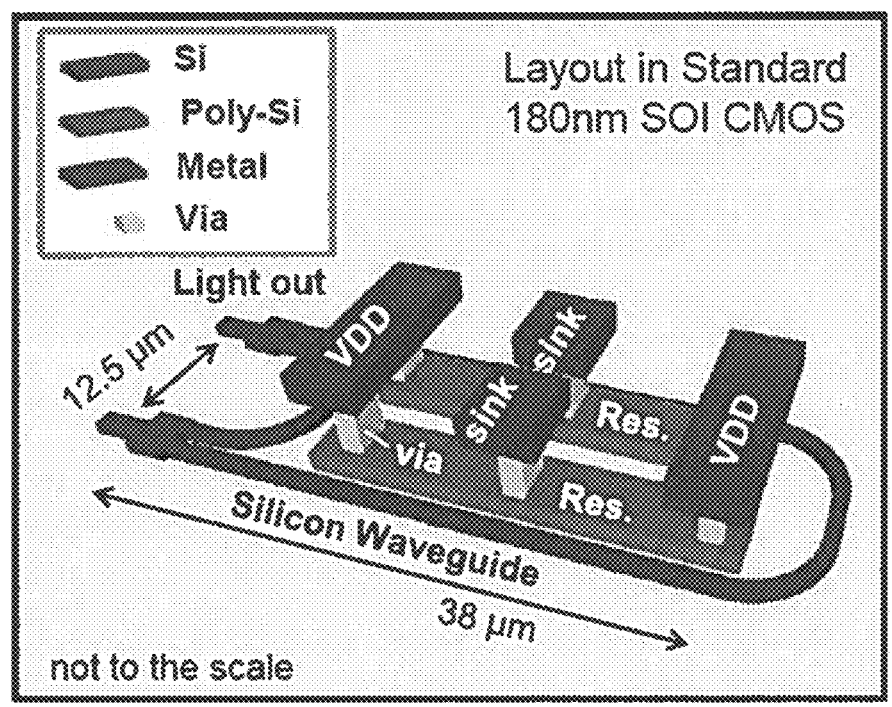
FIG. 11B illustrates an optical variable attenuator designed in the monolithic integration platform with a physical layout of the optical variable attenuator.
Figure 11C:
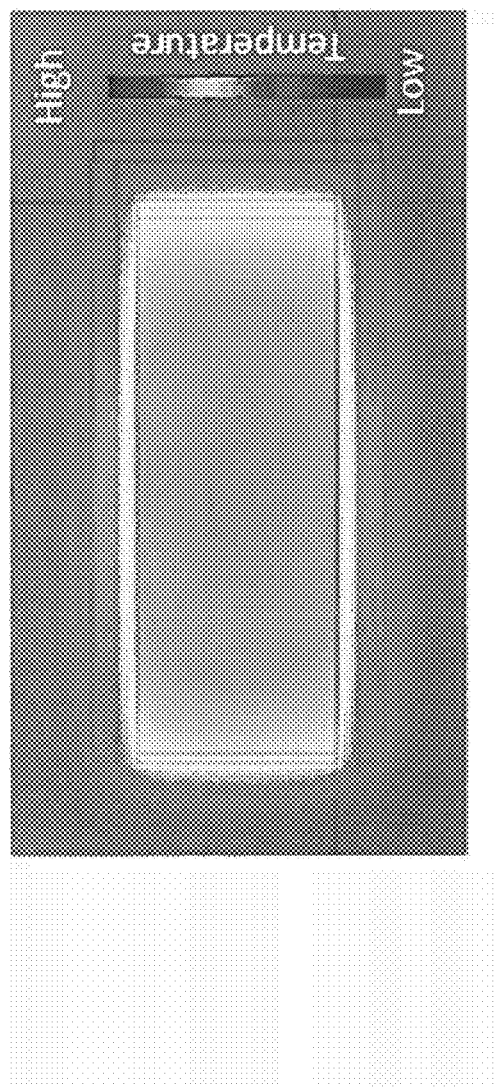
FIG. 11C illustrates an optical variable attenuator designed in the monolithic integration platform with a simulated temperature profile.
Figure 12:
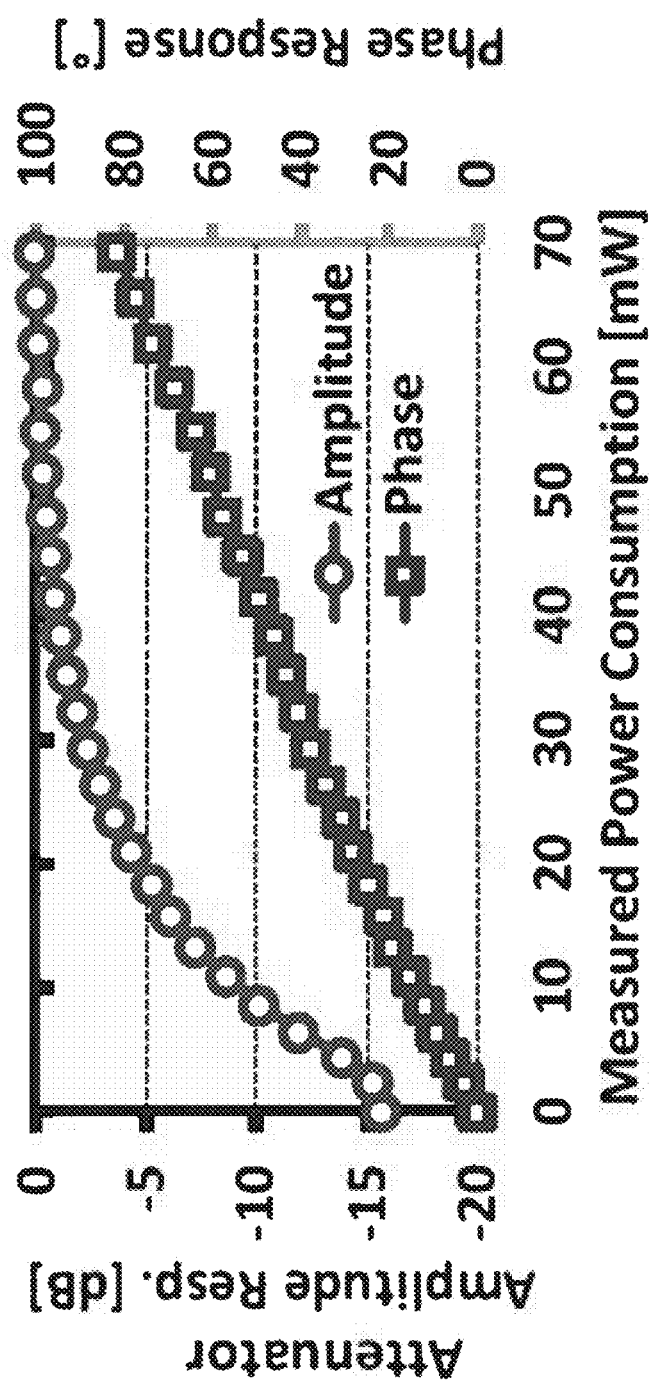
FIG. 12 illustrates a microphotograph and measured response of the optical variable attenuator at 1550-nm wavelength from an MZI-based standalone characterization structure.

FIG. 11A shows the operating principle of one specific realization of a thermo-optic variable attenuator that is used in a specific prototype chip, and performs array calibration and some sub-array beam forming. After the input light is equally split into two branches, only one branch is selectively heated and then the two branches combine again. Depending on the phase shift introduced by the heated branch, the output light intensity $P_o$ is modulated and can be approximated [34] as $$P_o = P_i \cos^2\left(\frac{\pi L}{\lambda}\frac{dn}{dT}\Delta T\right). \quad (8)$$

where L is the length of the heated waveguide section, and $\Delta T$ is the temperature rise of the heated section. The output light intensity variation slope is higher for low temperature and the slope gets smaller as the temperature goes higher. To have a large dynamic range control with relatively low power consumption, the variable attenuator is designed such that the maximum attenuation is obtained when the heater is off. This can be done by adjusting the length difference between the two branches. FIG. 11B shows one exemplary design for an optical variable attenuator for use in some embodiments of the present invention. For compact realization, the optical power splitter and the optical power combiner may be implemented using multi-mode interferometers (MMI). The temperature profile of an example optical variable attenuator with 3-dB attenuation setting, obtained from 3D FEM simulation, shows heat delivery from the two-segment heater to the adjacent straight waveguides (FIG. 11C). FIG. 12 shows the measured response of an example optical variable attenuator.

Optical Antenna

Various approaches may be used to realize a structure that efficiently couples the optical signal from the semiconductor substrate into free space, aka, an optical antenna. The optical signal can be coupled to the air from the top, back, or side of the semiconductor substrate.

Figure 13A:
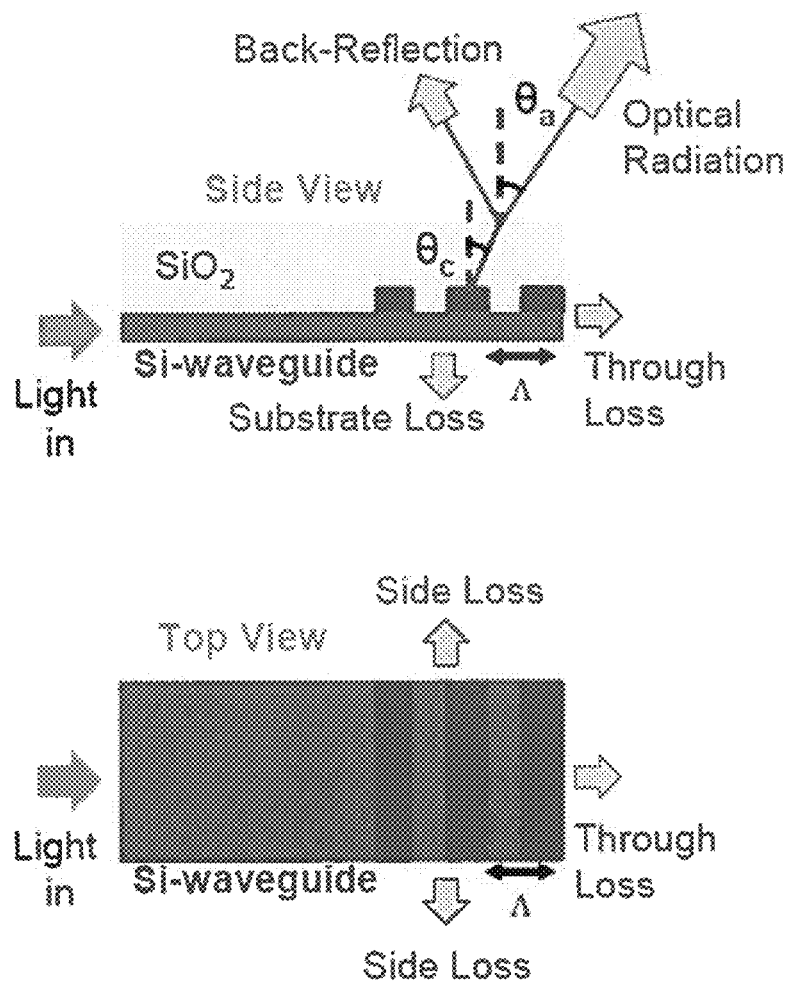
FIG. 13A illustrates a grating coupler optical antenna in the SOI CMOS monolithic integration platform with a Bragg reflection at the grating coupler.
Figure 13B:
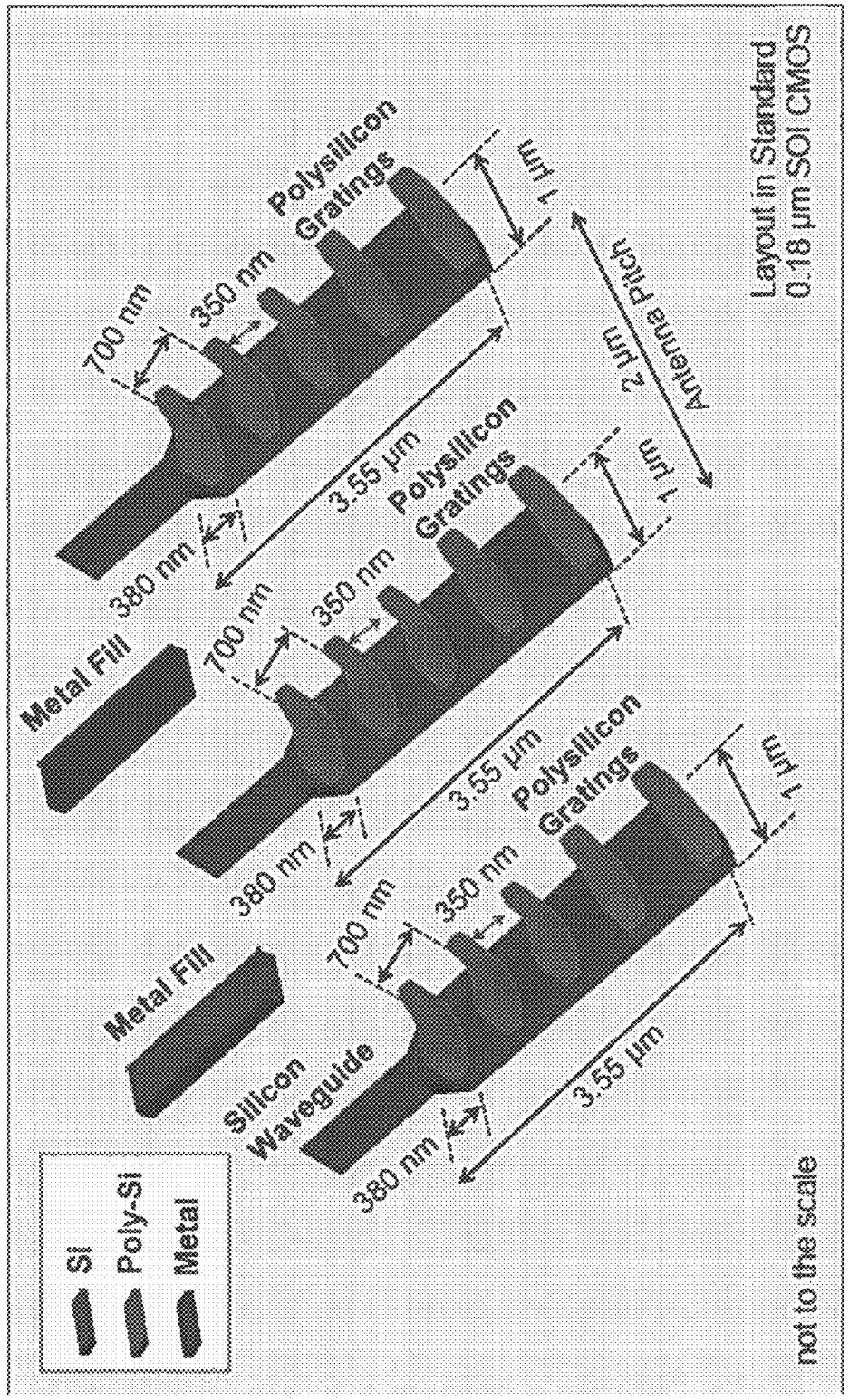
FIG. 13B illustrates a grating coupler optical antenna in the SOI CMOS monolithic integration platform with a physical layout and a realization of a large-scale array, which requires systematic metal fill in-between antenna feed waveguides to satisfy manufacturing film density requirement.
Figure 14B:
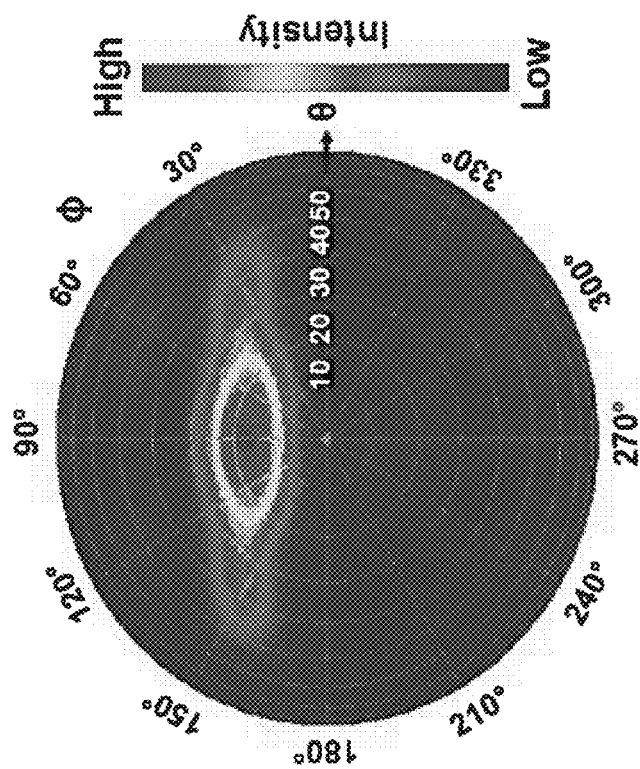
FIGS. 14A and 14B illustrate a simulated near-field and far-field radiation, respectively, of the grating coupler optical antenna of FIGS. 13A and 13B.
Figure 14A:
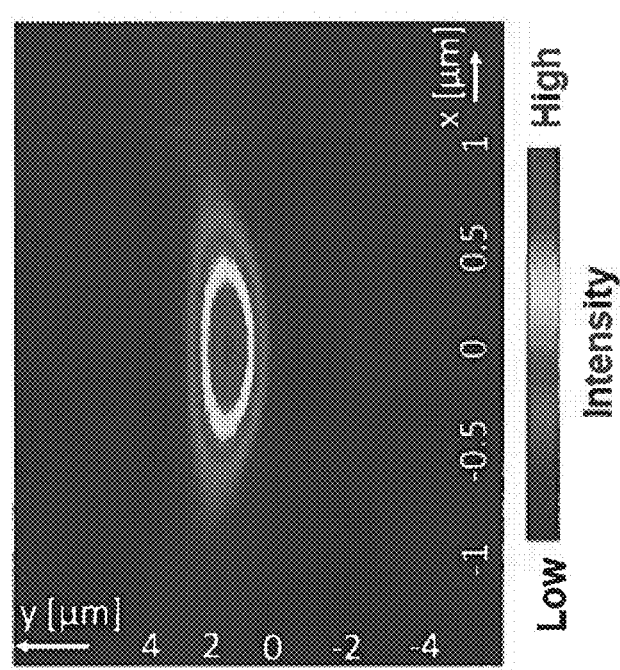

Grating couplers [13], [19] are used as an optical antenna in a specific prototype in order to couple the light in and out of the optical phased array chip. A typical grating coupler shown in FIG. 13A consists of the repeating grating teeth and the underlying waveguide. Following the fundamental Bragg reflection law, the grating period $\Lambda$ determines the angle $\theta_c$ of the radiation direction as $n_c \sin \theta_c = n_e - \lambda/\Lambda$ where $n_c$ is the refractive index of the cladding material and $n_e$ is the effective refractive index of the grating coupler determined by the geometry of the grating teeth and the waveguide. The radiation angle to the air $\theta_a$ is obtained with Snell's law as $\theta_a = \sin^{-1}(n_c \sin \theta_c/n_a)$. FIG. 13B shows an example design for a grating coupler in an antenna array to couple out the light for beam steering in the air. In this specific realization, the grating coupler consists of silicon strip waveguide in the bottom and polysilicon grating teeth in the top [19]. FIGS. 14A and 14B show, respectively, the simulated near field and far field radiation pattern of an example grating coupler optical antenna.

Nonlinear Current DAC with High-Voltage Output Driver

The electronic signals that are used to control the variable optical phase shifter and variable optical amplitude adjuster are analog in nature. To facilitate easy programming, digital to analog converters (DAC) may be used to convert a digital code to a desired analog control signal. The resolution of the DACs depends on the required accuracy of the control signals that is in turn dictated by the requirement on the created optical beam (e.g., beam width and scanning resolutions). The speeds or the sampling rates of the DACs depend on the required speed to create and/or scan a new electromagnetic beam or perform calibration.

The characteristics of an example optical variable attenuator (FIG. 12) shows that it may be desirable for the corresponding driving DAC to have a nonlinear transfer characteristics in order to have a uniform resolution with linear digital control on the nonlinear optical modulation.

Figure 15:
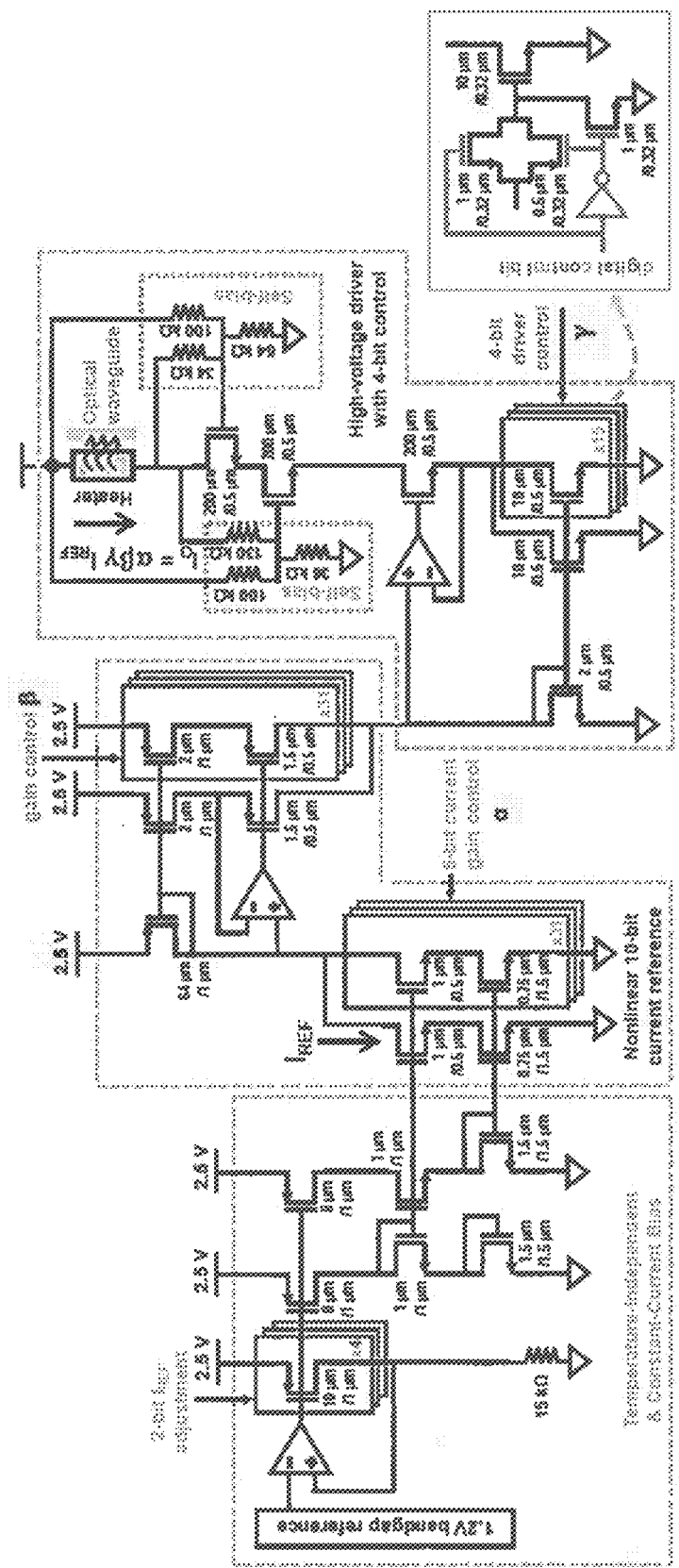
FIG. 15 illustrates a nonlinear current DAC consisting of a nonlinear 10-bit current reference and a high-voltage driver with 4-bit control.

FIG. 15 shows one exemplary circuit realization of a nonlinear current DAC according to the various embodiments of the present invention. This realization consists of two 5-bit current references followed by a high-voltage driver with a 4-bit current scaler, providing overall 14-bit digital control. The architecture is based on cascaded current multipliers [37]. An appropriate supply voltage is used to increase the maximum power delivery to the optical modulator heaters and also to reduce the IR drop over the metal interconnection from the DAC to the optical modulator heaters. To manage the higher supply voltages, high-voltage or I/O transistors in a stacked configuration may be used. The regulated current mirror at the high-voltage output driver is used to achieve a wide dynamic range of the DAC output current. The current mirror regulation may be implemented by using a two-stage operational amplifier. The resistive self-biasing network [38], [39] is designed such that it has a settling time that is similar to the operational amplifier so that the stacked transistors do not suffer excessive voltage stress during DAC output transitions. All bias voltages for the DAC may be generated using a bandgap reference such that the reference current $I_{REF}$ is independent of the chip temperature.

Figure 16A:
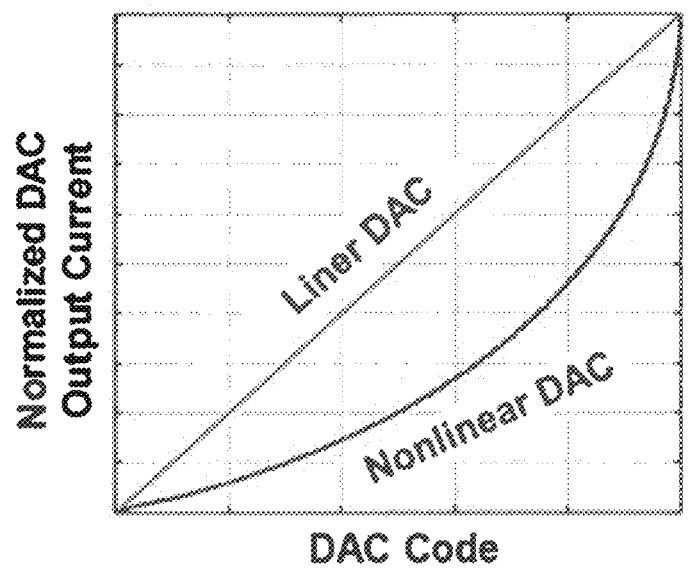
FIG. 16A illustrates a simulated DAC output current.
Figure 16B:
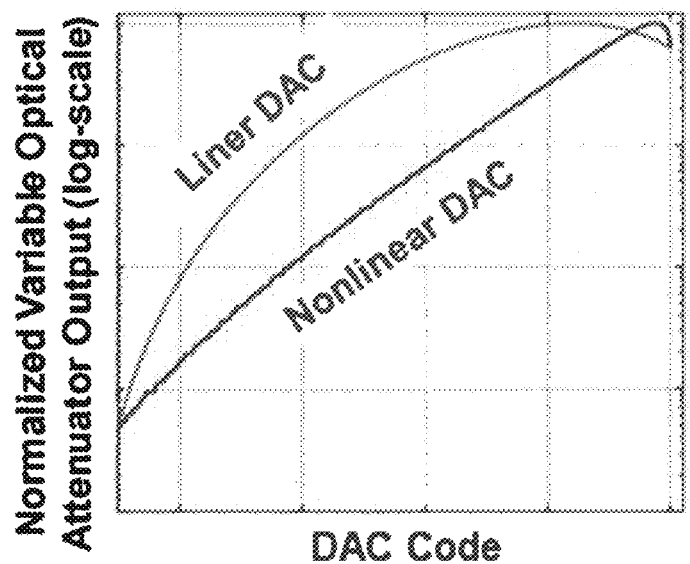
FIG. 16B illustrates a simulated output of an optical variable attenuator driven by the nonlinear DAC.
Figure 16C:
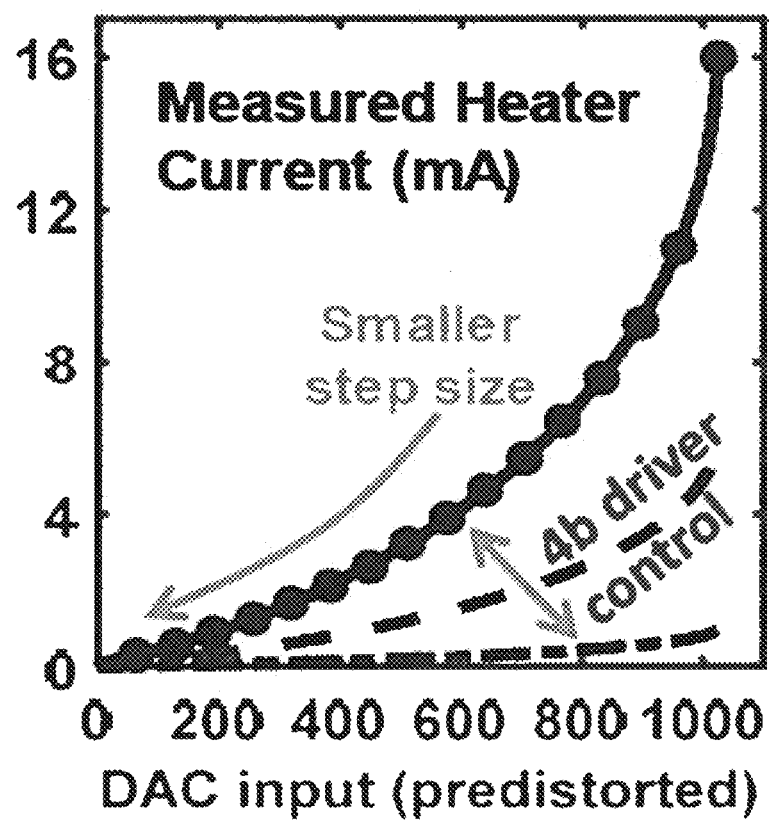
FIG. 16C illustrates a measured DAC output current.

FIGS. 16A, 16B, and 16C show the transfer characteristics of an example nonlinear DAC, which provides more uniform intensity control in dB scale with the optical variable attenuator, compared to a conventional linear DAC.

Monolithic Integration in SOI CMOS

Figure 17:
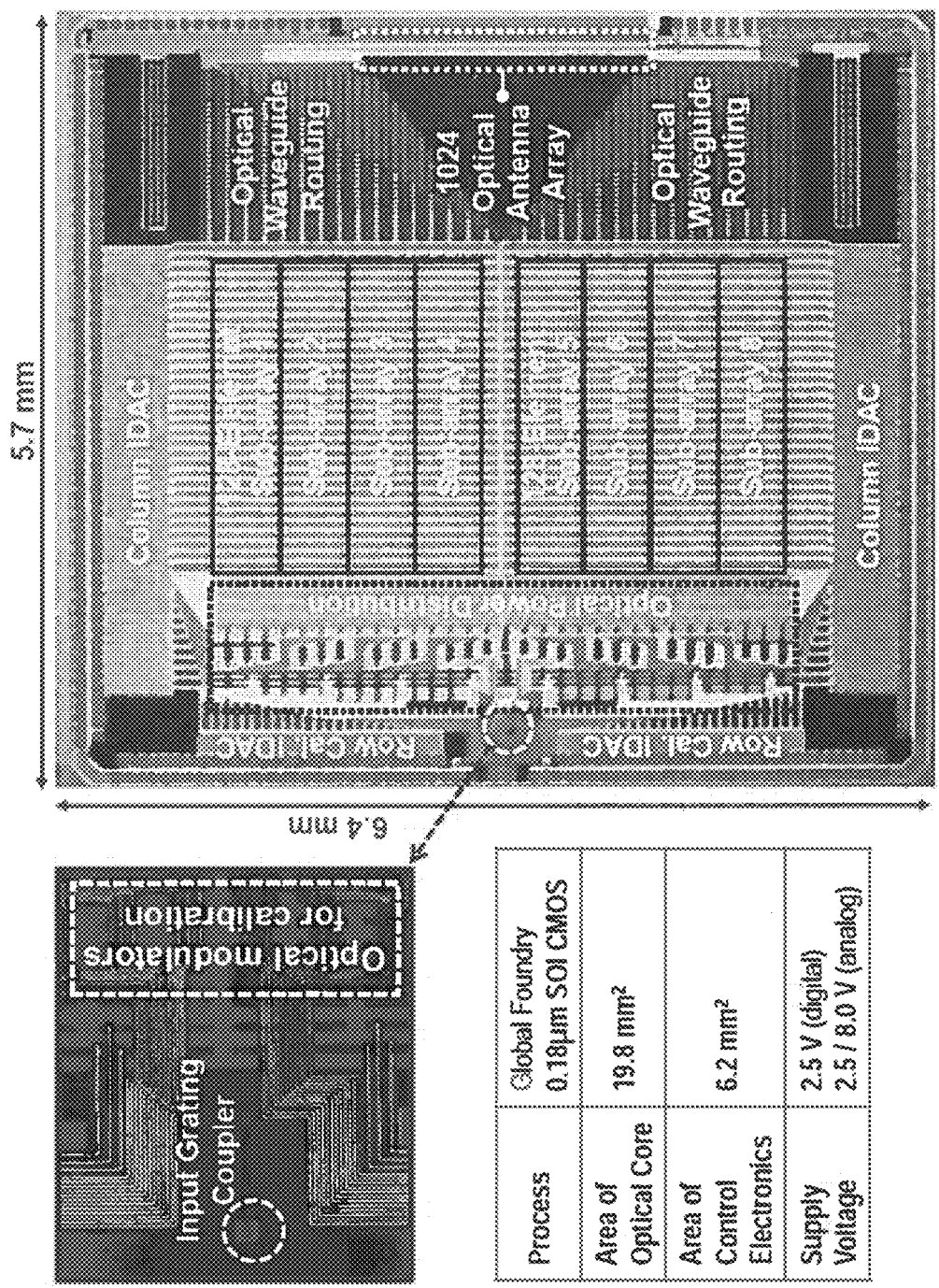
FIG. 17 illustrates a 1024-element optical phased array chip microphotograph.

The results of specific integrated realizations of optical phased arrays, following some of the embodiments, in a SOI CMOS technology are presented. Specifically, results of a 1024-element monolithic optical phased array (FIG. 17), which consists of 8 sub-arrays and 136 DACs, are presented. Furthermore, results of a 32-element sub-array, monolithically integrating 44 DACs, 32 optical variable phase shifters, 8 optical modulators for array calibration, and 4 dummy polysilicon heaters to keep a constant sub-array temperature, are presented. The optical phased array chips may be mounted on a printed circuit board (PCB). The optical input fiber may be connected to the chips using a V-groove structure.

Figure 18A:
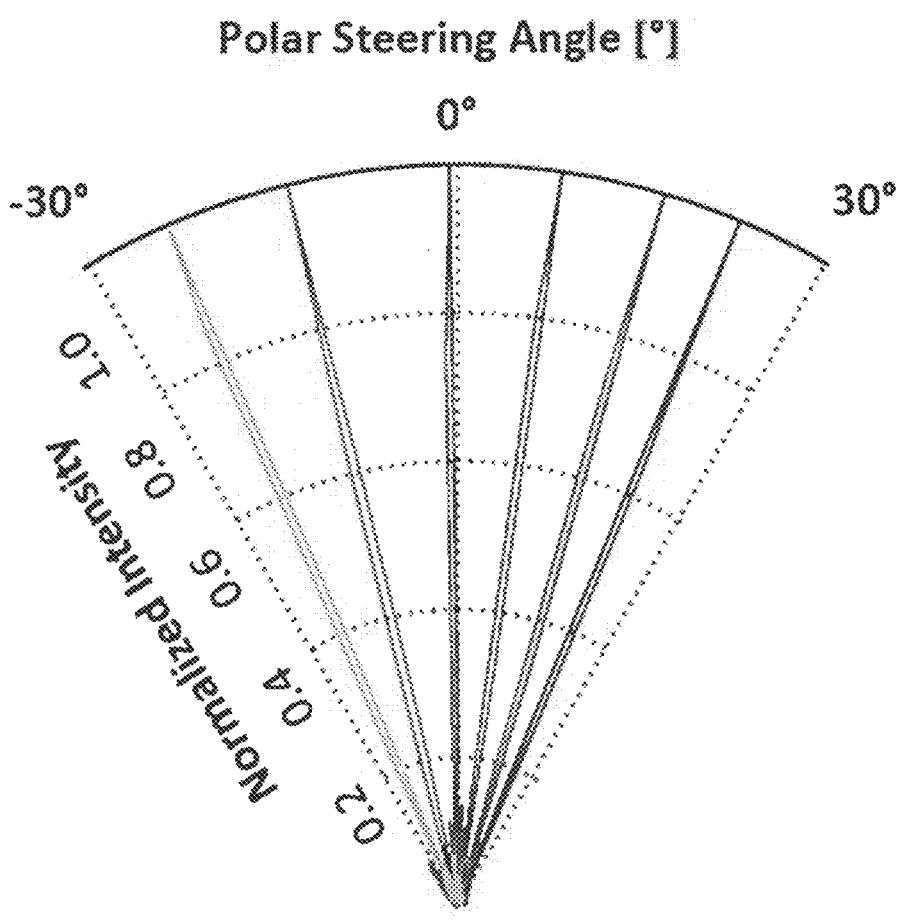
FIG. 18A illustrates a measured optical beam steering with the 32-element sub-array chip with normalized radiation intensity in linear polar coordinate.
Figure 18B:
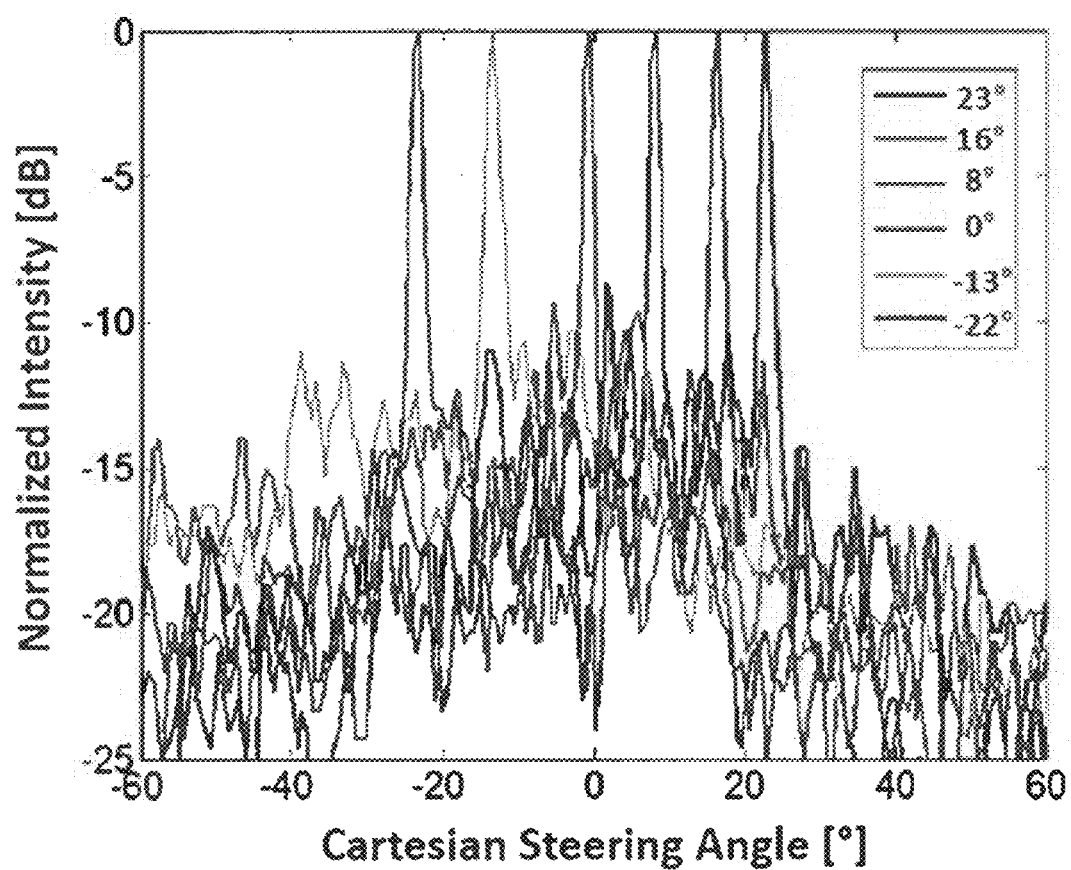
FIG. 18B illustrates a measured optical beam steering with the 32-element sub-array chip with normalized radiation intensity in log-scale Cartesian coordinate.
Figure 19:
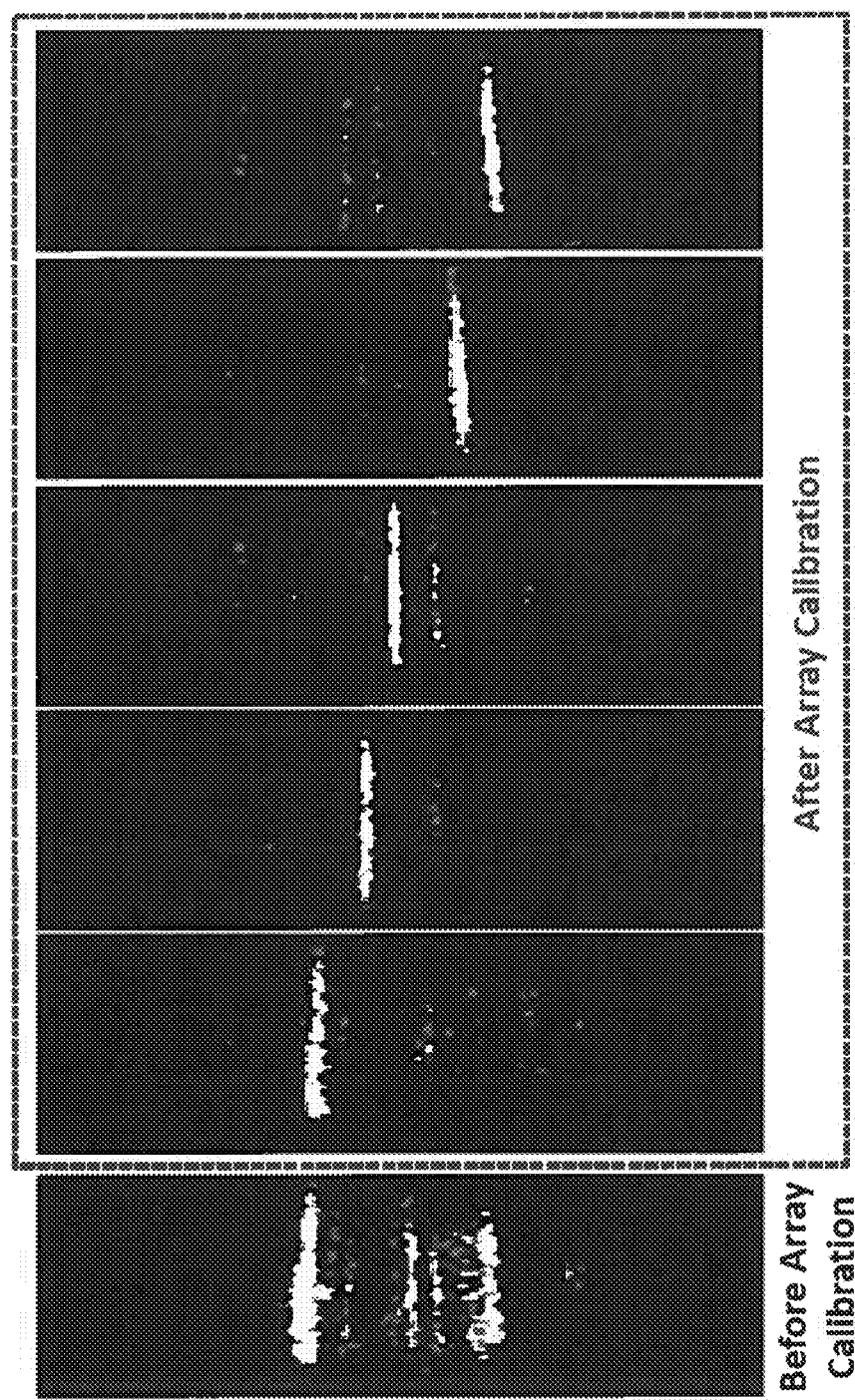
FIG. 19 illustrates a side-lobe suppression by array calibration.

FIGS. 18A and 18B shows the measured light intensity of the example 32-element optical phased array, demonstrating a 45° unambiguous optical beam steering range, and 1.2° optical beam-width. FIG. 19 shows that the 1024-element array achieves 0.03° optical beam width, demonstrating significant reduction from the 1.2° beam width of the 32-element sub-array.

Figure 20:
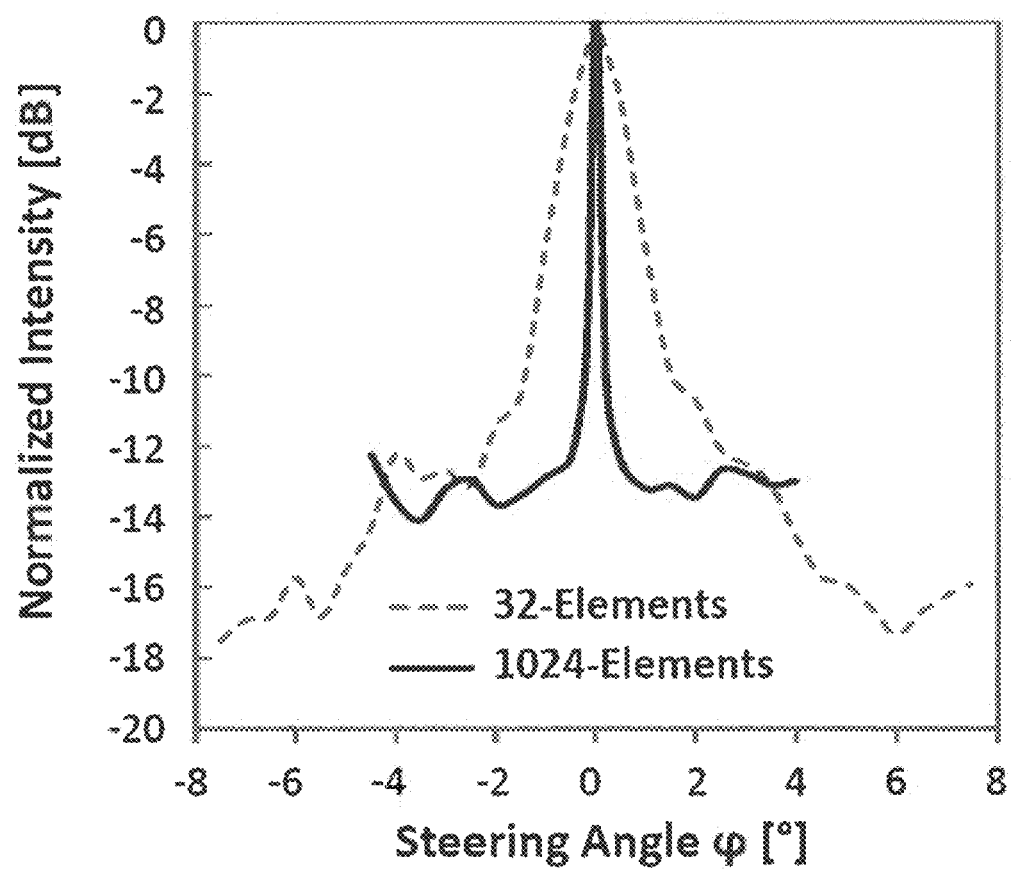
FIG. 20 illustrates a measured optical beam width of the 1024-element optical phased array.

A practical phased array should be calibrated given the fabrication process mismatches and variations, temperature gradients, inaccuracy of models and simulations, etc. In one embodiment, the array calibration may be iteratively performed by observing the far-field radiation pattern, and use this information to infer the relative amplitudes and phases of individual elements. Measured far-field patterns before and after calibration for a few representative beam angles are illustrated in FIG. 20. In another embodiment, array calibration may be incorporated on-chip without requiring explicit measurements of the far-field pattern. This may be done, for instance, by incorporating optical device or devices that directly or indirectly measure the relative phases between the array elements. The array calibration may be performed off-line (when the phased array is not in useful operation) or on-line.

The foregoing results show that an architecture-level solution in accordance with the various embodiments can be surmount the design challenges on realizing a very large-scale optical phased array for a diverse range of applications. In particular, a scalable optical phased array based on a hierarchical sub-array structure in accordance with the various embodiments, extends the array size beyond the conventional limit constrained by a finite optical coherence length. The nested sub-array structure also allows multiple optical variable phase shifters to share the same control electronics for linear beam steering. Hence, as shown above, a very large scale optical phased array with integrated control electronics can be realized in orders of magnitude smaller silicon footprint compared to the size of conventional optical phased array realizations. The architecture-level design technique of the various embodiments is platform-independent and thus can be applied to other general high-performance monolithic integration platforms such as based on thick SOI technology [40] for high-power or low-loss capability, silicon nitride technology [26] for visible light processing, GaN silicon photonics [41] for visible-to-mid infrared ultra-wideband light processing, and other compound semiconductors including indium phosphide (InP) and gallium arsenide (GaAs).

The architectural methods of this invention are applicable to optical phased arrays that operate in the transmit mode, receive mode, or both (transceiver). In one embodiment, an optical phased array transmitter at the visible wavelength may be used for projection or to create holographic 3D displays. In another embodiment, the optical phased array may be used to create a non-mechanical scanning beam for object detection, tracking, and ranging. In such a system, the optical phased array may be deployed in the transmitter, receiver, or both. For instance, an imaging system may consist of an optical phased array transmitter (scanning transmit beam) and a non-scanning receiver. Alternatively, an imaging system may consist of a non-scanning transmitter and an optical phased array receiver (scanning receive beam). Alternatively, an imaging system may consist of scanning transmitter and receiver enabled by phased arrays. In another embodiment, an optical phased array may be used in a transceiver scheme to enable free-space optical communication. Free-space optical communication, enabled by such optical phased array transceivers, may offer higher data-rate, directivity, and security when compared to traditional radiofrequency communications.

Although the foregoing discussion has been focus on the realization of a one-dimensional, various embodiments are not limited in this regard. That is, the methodologies described herein can be used to implement control of any monolithically integrated one- or two-dimensional optical phased array.

Further, the methodologies described herein can also be used to generate two-dimensional optical phased arrays via combination of the one-dimensional optical phased arrays described above. This is illustrated in FIGS. 21 and 22.

FIG. 24 schematically illustrates an embodiment of a two-dimensional optical phased array that is realized using a vertical stack of a number of one-dimensional optical phased arrays. As shown in FIG. 24, this can involve monolithically forming a first one-dimensional optical phased array and then monolithically forming additional one-dimensional optical phased arrays thereon. Alternatively, the monolithic one-dimensional optical phased arrays can be individually formed and thereafter can be bonded together to form the structure shown in FIG. 21. In either configuration, the arrays can be configured so that optical antennas for each array are all located at a same edge of the resulting structure. Thus, light emission can occur through one edge side, as shown in FIG. 21. Various integrated circuit stacking approaches may be used to construct the two-dimensional array. The combined arrays can be interconnected using a series of interconnects to provide vertical routing for control signals and power, as shown in FIG. 21. In this way, a very large scale two-dimensional optical phased array can be built without bottleneck in the metal interconnection for control signal and power routing. One advantage of this architecture is scalability. That is, theoretically, any arbitrary number of one-dimensional optical phased arrays can be combined.

Figure 21:
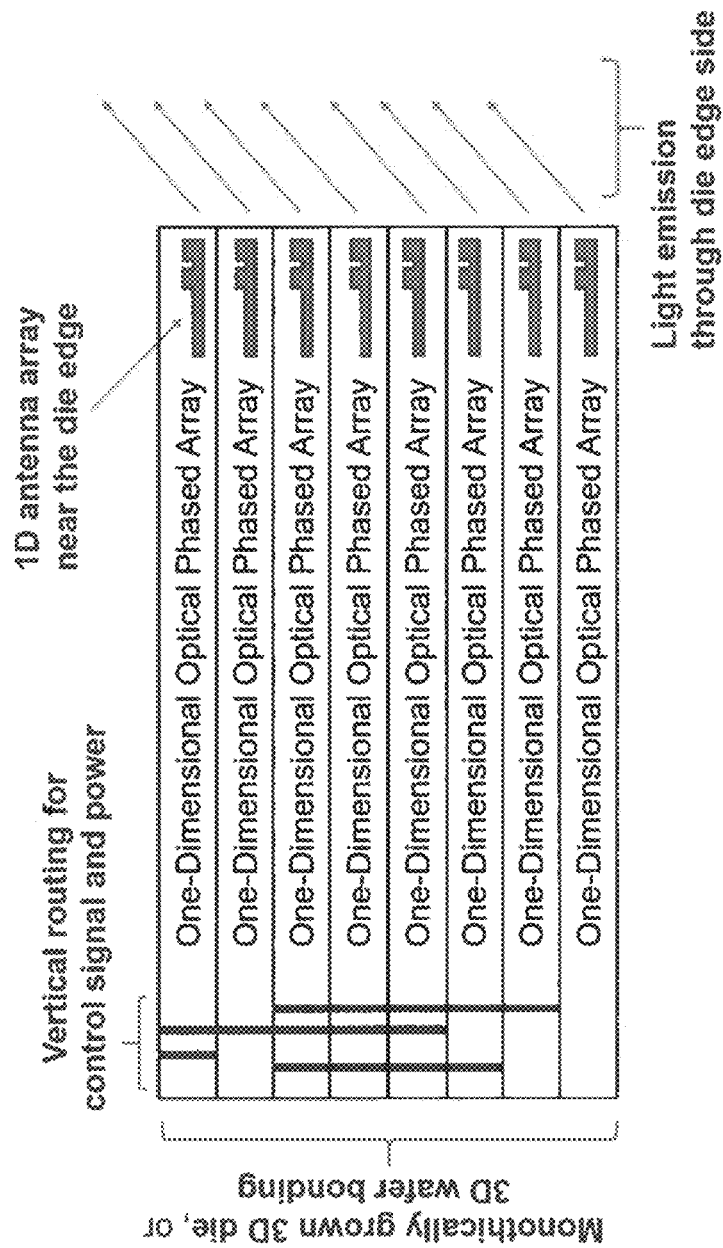
FIG. 21 depicts an embodiment of a two-dimensional optical phased array using one-dimensional optical phased arrays in accordance with the various embodiments.
Figure 22:
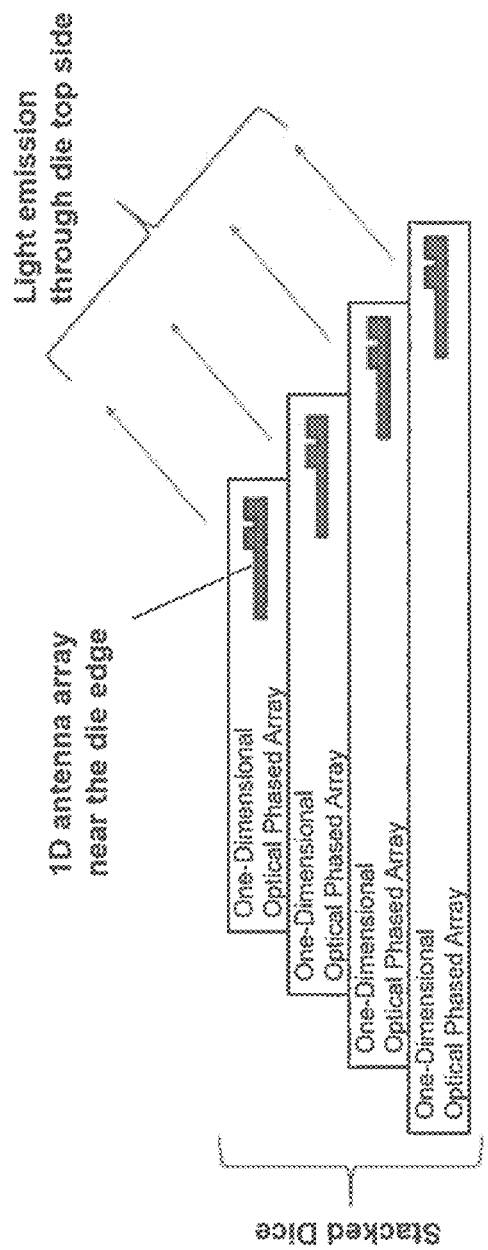
FIG. 22 depicts another embodiment of a two-dimensional optical phased array using one-dimensional optical phased arrays in accordance with the various embodiments.

However, assembling a two-dimensional optical phased array is not limited to the configuration in FIG. 21. FIG. 22 illustrates an alternative embodiment of a two-dimensional optical phased array that is realized using an alternative vertical stack of a number of one-dimensional optical phased arrays. Without using advanced fabrication or stacking technologies, such as monolithic 3D circuit fabrication or 3D wafer bonding, a large-scale two-dimensional optical phased array can be implemented by simply stacking multiple dice with gradual offset. One advantage of this scheme is that the light can be emitted through the top side of each die, so that additional fabrication steps to polish the die edge side are not required.

Modulating the wavelength of the input optical signal to the one-dimensional optical phased arrays described in this invention can also result in beam-steering in the second dimension resulting in a two-dimensional optical beam steering solution. By multiplexing multiple optical signals with different wavelengths, concurrent multi-beam steering is also allowed.

When transmitting information using the one-dimensional optical phased array described in this invention, the capacity of optical link can significantly increase by multiplexing multiple optical signals with the same wavelength but with a different orbital angular momentum (OAM) because the one-dimensional optical phased array does not include optical structures that are limiting the transmission of a particular OAM.

Figure 23:
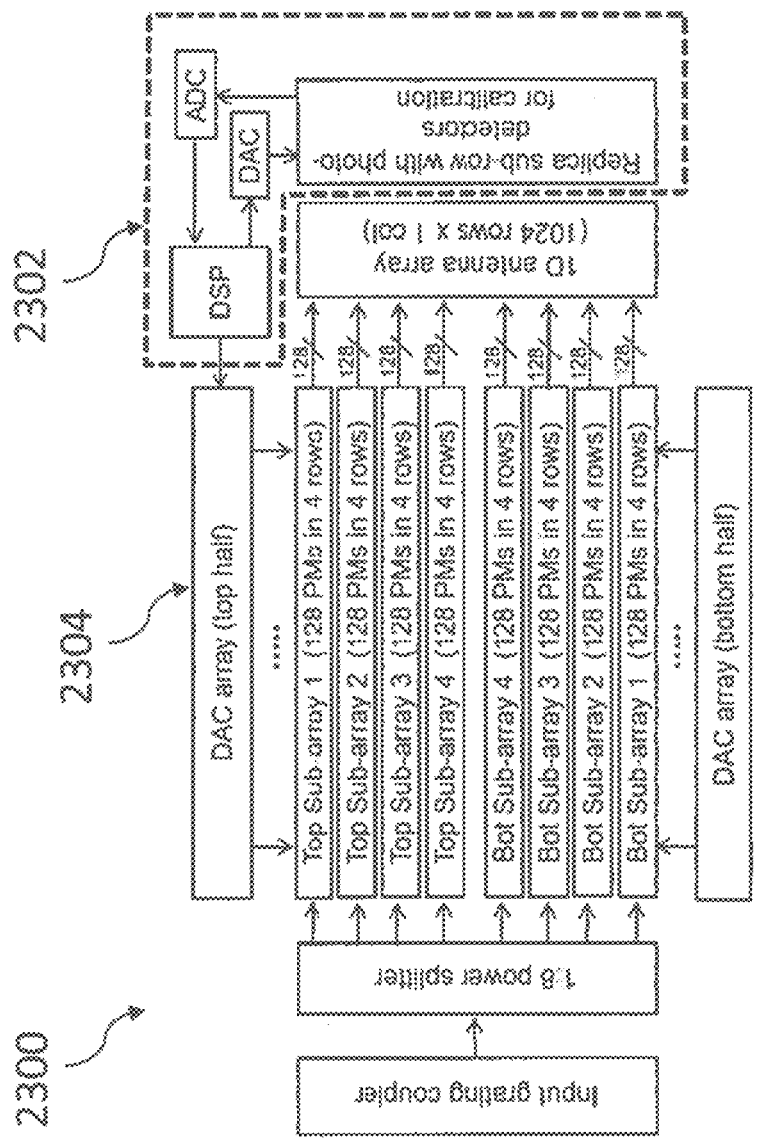
FIG. 23 illustrates a calibration scheme in accordance with the various embodiments.

FIG. 23 illustrates an embodiment an optical phased array 2300 including a replica sub-row structure 2602 for phase calibration. The phase response of the various components of the array 2300 can be sensitive to process variations. Thus, phase calibration of a large-scale optical phased array is imperative for proper operation. Because of dense routing, rather than integrating calibration circuitry into the array, a separate replica sub-row structure 2302 is used for array phase calibration. By evaluating the output of the antenna elements in the array, a calibration can be generated, which can then be fed back to the DACs to adjust the operation of phase shifters and/or amplitude adjusters in the array 2300.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

REFERENCES

The following references are discussed and referred herein for purposes of understanding the various embodiments. The contents of these references are hereby incorporated by reference in their entirety.

[1] B. Schwarz, "Lidar: Mapping the world in 3-D," Nature Photonics, vol. 4, no. 7, pp. 429-430, July 2010.
[2] T. K. Chan, M. Megens, B.-W. Yoo, J. Wyras, C. J. Chang-Hasnain, M. C. Wu, and D. A. Horsley, "Optical beamsteering using an 8×8 MEMS phased array with closed-loop interferometric phase control," Optics Express, vol. 21, no. 3, p. 2807, February 2013.
[3] L. Ye, G. Zhang, Z. You, and C. Zhang, "A 2-D resonant MEMS scanner with an ultra-compact wedge-like multiplied angle amplification for miniature LIDAR application," in IEEE Sensors, October 2016, pp. 1-3.
[4] Y. Wang and M. C. Wu, "Micromirror based optical phased array for wide-angle beamsteering," in Proc. IEEE International Conference on Micro Electro Mechanical Systems, 2017, pp. 897-900.
[5] P. McManamon, T. Dorschner, D. Corkum, L. Friedman, D. Hobbs, M. Holz, S. Liberman, H. Nguyen, D. Resler, R. Sharp, and E. Watson, "Optical phased array technology," Proceedings of the IEEE, vol. 84, no. 2, pp. 268-298, February 1996.
[6] X. Wang, B. Wang, P. J. Bos, P. F. McManamon, J. J. Pouch, F. A. Miranda, and J. E. Anderson, "Modeling and design of an optimized liquid-crystal optical phased array," Journal of Applied Physics, vol. 98, no. 7, p. 073101, October 2005.
[7] F. Yaras, H. Kang, and L. Onural, "State of the art in holographic displays: A survey," Journal of Display Technology, vol. 6, no. 10, pp. 443-454, October 2010.
[8] D. E. Smalley, Q. Y. J. Smithwick, V. M. Bove, J. Barabas, and S. Jolly, "Anisotropic leaky-mode modulator for holographic video displays," Nature, vol. 498, no. 7454, pp. 313-317, June 2013.
[9] H. Hashemi, X. Guan, and A. Hajimiri, "A fully integrated 24 GHz 8-path phased-array receiver in silicon," in IEEE International Solid-State Circuits Conf. Tech. Dig. Papers, 2004, pp. 390-391.
[10] F. Vasey, F. K. Reinhart, R. Houdre, and J. M. Stauffer, "Spatial optical beam steering with an AlGaAs integrated phased array," Applied optics, vol. 32, no. 18, pp. 3220-3232, 1993.
[11] K. Van Acoleyen, W. Bogaerts, J. Jgersk, N. Le Thomas, R. Houdr, and R. Baets, "Off-chip beam steering with a one-dimensional optical phased array on silicon-on-insulator," Optics Letters, vol. 34, no. 9, p. 1477, May 2009.
[12] K. Van Acoleyen, H. Rogier, and R. Baets, "Two-dimensional optical phased array antenna on silicon-on-Insulator," Optics Express, vol. 18, no. 13, p. 13655, June 2010.
[13] J. Sun, E. Timurdogan, A. Yaacobi, E. S. Hosseini, and M. R. Watts, "Large-scale nanophotonic phased array," Nature, vol. 493, no. 7431, pp. 195-199, January 2013.
[14] Weihua Guo, P. R. A. Binetti, C. Althouse, M. L. Masanovic, H. P. M. M. Ambrosius, L. A. Johansson, and L. A. Coldren, "Two-Dimensional Optical Beam Steering With InP-Based Photonic Integrated Circuits," IEEE Journal of Selected Topics in Quantum Electronics, vol. 19, no. 4, pp. 6 100 212-6 100 212, July 2013.
[15] D. Kwong, A. Hosseini, J. Covey, Y. Zhang, X. Xu, H. Subbaraman, and R. T. Chen, "On-chip silicon optical phased array for two-dimensional beam steering," Optics Letters, vol. 39, no. 4, p. 941, February 2014.
[16] A. Yaacobi, J. Sun, M. Moresco, G. Leake, D. Coolbaugh, and M. R. Watts, "Integrated phased array for wide-angle beam steering," Optics Letters, vol. 39, no. 15, p. 4575, August 2014.
[17] F. Aflatouni, B. Abiri, A. Rekhi, and A. Hajimiri, "Nanophotonic projection system," Optics Express, vol. 23, no. 16, p. 21012, August 2015.
[18] J. C. Hulme, J. K. Doylend, M. J. R. Heck, J. D. Peters, M. L. Davenport, J. T. Bovington, L. A. Coldren, and J. E. Bowers, "Fully integrated hybrid silicon two dimensional beam scanner," Optics Express, vol. 23, no. 5, p. 5861, March 2015.
[19] H. Abediasl and H. Hashemi, "Monolithic optical phased-array transceiver in a standard SOI CMOS process," Optics Express, vol. 23, no. 5, p. 6509, March 2015.
[20] C. V. Poulton, D. B. Cole, A. Yaacobi, and M. R. Watts, "Frequency-modulated continuous-wave LIDAR module in silicon photonics," in Proc. Optical Fiber Communication Conference, 2016, pp. 1-3.
[21] D. N. Hutchison, J. Sun, J. K. Doylend, R. Kumar, J. Heck, W. Kim, C. T. Phare, A. Feshali, and H. Rong, "High-resolution aliasing-free optical beam steering," Optica, vol. 3, no. 8, p. 887, August 2016.
[22] C. Michael and M. Ismail, "Statistical modeling of device mismatch for analog MOS integrated circuits," IEEE Journal of Solid-State Circuits, vol. 27, no. 2, pp. 154-166, February 1992.
[23] L. Chrostowski, X. Wang, J. Flueckiger, Y. Wu, Y. Wang, and S. T. Fard, "Impact of fabrication non-uniformity on chip-scale silicon photonic integrated circuits," in Proc. Optical Fiber Communication Conference, 2014, pp. 1-3.
[24] Y. Yang, Y. Ma, H. Guan, Y. Liu, S. Danziger, S. Ocheltree, K. Bergman, T. Baehr-Jones, and M. Hochberg, "Phase coherence length in silicon photonic platform," Optics Express, vol. 23, no. 13, p. 16890, June 2015.
[25] C. Sun, M. Wade, M. Georgas, S. Lin, L. Alloatti, B. Moss, R. Kumar, A. H. Atabaki, F. Pavanello, J. M. Shainline, J. S. Orcutt, R. J. Ram, M. Popovic, and V. Stojanovic, "A 45 nm CMOS-SOI monolithic photonics platform with bit-statistics-based resonant microring thermal tuning," IEEE Journal of Solid-State Circuits, vol. 51, no. 4, pp. 893-907, April 2016.
[26] C. V. Poulton, M. J. Byrd, M. Raval, Z. Su, N. Li, E. Timurdogan, D. Coolbaugh, D. Vermeulen, and M. R. Watts, "Large-scale silicon nitride nanophotonic phased arrays at infrared and visible wavelengths," Optics Letters, vol. 42, no. 1, p. 21, January 2017.
[27] R. Adar, C. H. Henry, M. A. Milbrodt, and R. C. Kistler, "Phase coherence of optical waveguides," Journal of lightwave technology, vol. 12, no. 4, pp. 603-606, 1994.
[28] R. Feced and M. Zervas, "Effects of random phase and amplitude errors in optical fiber Bragg gratings," Journal of Lightwave Technology, vol. 18, no. 1, pp. 90-101, January 2000.
[29] C. Henry, "Theory of the linewidth of semiconductor lasers," IEEE Journal of Quantum Electronics, vol. 18, no. 2, pp. 259-264, February 1982.
[30] A. D. Simard, G. Beaudin, V. Aimez, Y. Painchaud, and S. LaRochelle, "Characterization and reduction of spectral distortions in Silicon-on-Insulator integrated Bragg gratings," Optics Express, vol. 21, no. 20, p. 23145, October 2013.
[31] A. V. Krishnamoorthy, X. Zheng, G. Li, J. Yao, T. Pinguet, A. Mekis, H. Thacker, I. Shubin, Y. Luo, K. Raj, and J. E. Cunningham, "Exploiting CMOS manufacturing to reduce tuning requirements for resonant optical devices," IEEE Photonics Journal, vol. 3, no. 3, pp. 567-579, June 2011.
[32] W. A. Zortman, D. C. Trotter, and M. R. Watts, "Silicon photonics manufacturing," Optics express, vol. 18, no. 23, pp. 23 598-23 607, 2010.
[33] N. C. Harris, Y. Ma, J. Mower, T. Baehr-Jones, D. Englund, M. Hochberg, and C. Galland, "Efficient, compact and low loss thermo-optic phase shifter in silicon," Optics Express, vol. 22, no. 9, p. 10487, May 2014.
[34] L. Chrostowski and M. Hochberg, Silicon Photonics Design. Cambridge University Press, 2015.
[35] A. Yariv, "Coupled-mode theory for guided-wave optics," IEEE Journal of Quantum Electronics, vol. 9, no. 9, pp. 919-933, September 973.
[36] A. Yariv and P. Yeh, Photonics: Optical Electronics in Modern Communications. Oxford University Press, 2007.
[37] P. Kinget and M. Steyaert, "A programmable analog cellular neural network CMOS chip for high speed image processing," IEEE Journal of Solid-State Circuits, vol. 30, no. 3, pp. 235-243, March 1995.
[38] M. Apostolidou, M. P. van der Heij den, D. M. W. Leenaerts, J. Sonsky, A. Heringa, and I. Volokhine, "A 65 nm CMOS 30 dBm class-E RF power amplifier with 60% PAE and 40% PAE at 16 dB back-Off," IEEE Journal of Solid-State Circuits, vol. 44, no. 5, pp. 1372-1379, May 2009.
[39] P. A. Godoy, S. Chung, T. W. Barton, D. J. Perreault, and J. L. Dawson, "A 2.4-GHz, 27-dBm asymmetric multilevel outphasing power amplifier in 65-nm CMOS," IEEE Journal of Solid-State Circuits, vol. 47, no. 10, pp. 2372-2384, October 2012.
[40] M. Cherchi, S. Ylinen, M. Harjanne, M. Kapulainen, and T. Aalto, "Dramatic size reduction of waveguide bends on a micron-scale silicon photonic platform," Optics Express, vol. 21, no. 15, p. 17814, July 2013.
[41] C. Xiong, W. Pernice, K. K. Ryu, C. Schuck, K. Y. Fong, T. Palacios, and H. X. Tang, "Integrated GaN photonic circuits on silicon (100) for second harmonic generation," Optics Express, vol. 19, no. 11, pp. 10 462-10 470, May 2011.
[42] C. V. Poulton, A. Yaccobi, Z. Su, M. J. Byrd, and M. R. Watts, "Optical phased array with small spot size, high steering range and grouped cascaded phase shifters," in Proc. Advanced Photonics Congress, 2016, pp. 1-3.
[43] A. V. Krasavin and A. V. Zayats, "Silicon-based plasmonic waveguides," Opt. Express 18, 11791-11799, 2010.

What is claimed is:

1. An optical device comprising:
a row of optical units, each of the optical units including an optical antenna and an associated optical variable phase shifter, the optical antenna of each optical unit being configured to radiate or receive an optical signal, the row of optical units being grouped into sub-rows of optical units, each sub-row of optical units including a respective portion of the optical antennas and a respective portion of the associated optical variable phase shifters;
a first optical power splitter optically coupled to a first optical input/output element; and
a first plurality of boundary adjustment elements, each corresponding one of the first plurality of boundary adjustment units being optically coupled to the first optical power splitter and a corresponding one of the sub-rows of optical units, each corresponding one of the first plurality of boundary adjustment elements including (i) a sub-row optical variable phase shifter optically coupled to a corresponding sub-row of optical units and (ii) a sub-row optical variable amplitude adjuster optically coupled to the corresponding sub-row of optical units,
wherein a phase of the optical signal of the optical antenna of a respective one of the optical units is determined by at least (i) the optical variable phase shifter associated with the respective one of the optical units and (ii) the sub-row optical variable phase shifter of the corresponding one of the first plurality of boundary adjustment elements optically coupled to the corresponding sub-row of optical units of the respective one of the optical units, and
wherein an amplitude of the optical signal of the respective optical unit is determined by at least the sub-row optical amplitude adjuster of the corresponding one of the first plurality of boundary adjustment elements optically coupled to the corresponding sub-row of optical units of the respective one of the optical units.

2. The device of claim 1, wherein each of the different sub-rows includes N of the optical units, and wherein the device further comprises:
a controller; and
a plurality of digital to analog converters (DACs) communicably coupling the controller to the optical units and the first plurality of boundary adjustment elements,
wherein each of the first plurality of boundary adjustment elements is associated with a different one of the plurality of DACs, and N of the plurality of DACs are associated with different sub-rows, and wherein an $i^{th}$ one of the N of the plurality of DACs is associated with an $i^{th}$ one of the N optical units in each of the different sub-rows.

3. The device of claim 2 wherein at least a portion of the plurality of DACs are non-linear.

4. The device of claim 2, further comprising a calibration circuit for monitoring an output at the row of optical units and for generating control signals for at least a portion of the plurality of DACs.

5. The device of claim 1, wherein the first optical input/output element comprises a second optical power splitter coupled to a second optical input/output element, and further comprising a second plurality of boundary adjustment elements, wherein one of the second plurality of boundary adjustment units optically couples the second optical power splitter to the first optical power splitter, and wherein each of the second plurality of boundary adjustment elements comprises a row optical variable phase shifter and a row optical variable amplitude adjuster,
wherein the phase of the optical signal of the optical antenna of the respective one of the optical units is further determined by the optical variable phase shifter of a corresponding one of the second plurality of boundary adjustment elements, and
wherein the amplitude of the optical signal of the optical antenna of the respective one of the optical units is further determined by the optical variable amplitude adjuster of the corresponding one of the second plurality of boundary adjustment elements.

6. The device of claim 5, wherein the second optical input/output element comprises a third optical power splitter coupled to a third optical input/output element, and further comprising a third plurality of boundary adjustment elements, wherein one of the third plurality of boundary adjustment units optically couples the third optical power splitter to the second optical power splitter, and wherein each of the third plurality of boundary adjustment elements comprises a sub-array optical variable phase shifter and a sub-array optical variable amplitude adjuster, wherein the phase of the optical signal of the optical antenna of the respective one of the optical units is further determined by the optical variable phase shifter of a corresponding one of the third plurality of boundary adjustment elements, and wherein the amplitude of the optical signal of the optical antenna of the respective one of the optical units is further determined by the optical variable amplitude adjuster of the corresponding one of the third plurality of boundary adjustment elements.

7. The device of claim 1, further comprising at least one of a light source or a photodetector optically coupled to the row of optical antenna elements via the first optical power splitter and the first plurality of boundary adjustment elements.

8. The device of claim 1, further comprising an integrated circuit device having the row of optical units, the first optical power splitter, and the first plurality of boundary adjustment elements formed therein.

9. An optical device, comprising:

an array of optical antenna elements, each optical antenna element being configured to output a respective optical signal;

a first plurality of phase shifters, each of the first plurality of phase shifters associated with different portions of the array of optical antenna elements;

a second plurality of phase shifters, each optically coupling one of the optical elements in the array to the associated one of the first plurality of phase shifters, such that a phase of the respective optical signal output by each optical antenna element is determined by at least one of the first plurality of phase shifters and one of the second plurality of phase shifters; and a plurality of digital to analog converters (DACs) configured to generate control signals for the first plurality of phase shifters and the second plurality of phase shifters, each of a first portion the plurality of DACs being configured to generate control signals for a respective one of the first plurality of phase shifters, each of a second portion of the plurality of DACs being configured to generate control signals for two or more phase shifters of the second plurality of phase shifters.

10. The device of claim 9, further comprising a controller for controlling the plurality of DACs.

11. The device of claim 9, further comprising a plurality of amplitude adjustment elements associated with each of the first plurality of phase shifters.

12. The device of claim 9, wherein at least one of the plurality of DACs is non-linear.

13. The device of claim 9, wherein a number of the optical elements is $N^2$, wherein a number of the first plurality of phase shifters and the second plurality of phase shifters is at least $N^2$, and wherein a number of the plurality of DACs is about $2N-1$.

14. The device of claim 9, further comprising a calibration circuit for monitoring an output at the array of optical antenna elements and for generating control signals for at least a portion of the plurality of DACs.

15. The device of claim 9, further comprising at least one light source optically coupled to the array of optical antenna elements via the first plurality of phase shifters and the second plurality of phase shifters.

16. The device of claim 15, wherein the at least one light source comprises a laser.

17. The device of claim 15, wherein the at least one light source comprises a modulated optical signal.

18. The device of claim 9, further comprising at least one photodetector optically coupled to the array of optical antenna elements via the first plurality of phase shifters and the second plurality of phase shifters.

19. The device of claim 9, wherein the array of optical antenna elements is a two-dimensional array.

20. The device of claim 9, further comprising an integrated circuit device having the array of optical antenna elements, the first plurality of phase shifters, the second plurality of phase shifters, and the plurality of digital to analog converters (DACs) formed therein.

* * * * *